United States Patent
Ide

(10) Patent No.: US 6,169,619 B1
(45) Date of Patent: Jan. 2, 2001

(54) APPARATUS AND METHOD FOR RECEPTION OF OPTICAL SIGNAL

(75) Inventor: Satoshi Ide, Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/053,499

(22) Filed: Apr. 2, 1998

(30) Foreign Application Priority Data

Oct. 20, 1997 (JP) .................................................. 9-286982

(51) Int. Cl.[7] .................................................. H04B 10/06
(52) U.S. Cl. .......................... 359/189; 359/194; 375/345; 455/232.1; 455/234.2; 455/235.1; 455/239.1; 330/136; 250/214 AG
(58) Field of Search .......................... 375/345; 359/189, 359/194; 455/232.1, 234.1, 234.2, 235.1, 239.1; 330/136; 250/214 AG

(56) References Cited

U.S. PATENT DOCUMENTS

| | | | |
|---|---|---|---|
| 5,457,811 | * 10/1995 | Lemson | 455/67.1 |
| 5,610,946 | * 3/1997 | Tanaka et al. | 375/269 |
| 5,678,198 | * 10/1997 | Lemson | 455/67.1 |
| 5,784,356 | * 7/1998 | Hayashi et al. | 369/124 |
| 5,848,104 | * 12/1998 | Ishizu | 375/324 |
| 6,049,361 | * 4/2000 | Kim | 348/678 |

FOREIGN PATENT DOCUMENTS 4-35330   2/1992   (JP) .

* cited by examiner

Primary Examiner—Huy D. Vu
Assistant Examiner—Vu Lieu
(74) Attorney, Agent, or Firm—Staas & Halsey

(57) ABSTRACT

An optical signal receiving apparatus capable of substantially instantaneously and stably discriminating the logic from the header of a burst-like optical signal comprising a pre-amplifier circuit for amplifying an output from a photodiode receiving cell signals, a dummy side variable gain amplifying unit for performing the gain control by feedback control with respect to the output from the pre-amplifier circuit and outputting the gain at that time as gain information, a memory unit for holding the gain information, and a signal side variable gain amplifying unit for performing the gain control by feedfoward control by using the gain set by the gain information and outputting the amplified signal.

21 Claims, 22 Drawing Sheets

APPARATUS AND METHOD FOR RECEPTION OF OPTICAL SIGNAL

BACKGROUND OF THE INVENTION

1. Field of the Invention

The present invention relates to an optical signal receiving apparatus and method.

Along with the development of multimedia technology, optical communication using optical fibers has been rapidly spreading. Particularly, while optical communication hithertofore had mainly spread at the trunk line side, in the future optical communication will mainly spread at the subscriber side for realizing "fiber to the home" (FTTH) systems. The "subscriber side" referred to here includes not only individual subscribers (users), but also local area networks (LANs) etc.

In for example a passive optical network (PON) transmission system, the subscriber side is constituted by an optical splitter (star coupler) connected to the office side equipment via a common optical fiber transmission line and a plurality of units of subscriber side equipment individually connected to this optical splitter via individual optical fiber transmission lines. Here, downstream optical transmission from the office side equipment to each subscriber side equipment is carried out by continuously transmitting cell signals, while upstream optical transmission from the plurality of units of subscriber side equipment to the office side equipment is carried out by using time slots allotted to the units of subscriber side equipment in advance and transmitting the cell signals of each subscriber in a burst-like manner in a time division mode in units of cells each having a fixed bit length.

Looking at the latter upstream optical transmission, the office side equipment receives the bursts of cell signals from the optical transmission apparatuses of the units of subscriber side equipment. The present invention relates to an optical signal receiving apparatus which receives the burst-like cell signals in the office side equipment. This optical signal receiving apparatus receives cell signals having different levels of received light for every time slot due to the difference of transmission loss of the individual optical fiber transmission lines. Therefore, the automatic gain control (AGC) for this becomes important subjects.

2. Description of the Related Art

As will be explained in detail below referring to the drawings, there are the following problems in the related art.

Since the optical signal receiving apparatus receives the cell signals having different amplitude levels in bursts for every subscriber, the optical signal receiving apparatus has to instantaneously determine the optimum detection state for each amplitude of the incoming cell signals, that is, the optimum gain.

However, the optical signal receiving apparatus must be given a considerably large range of variation of gain control in order to cope with burst-like cell signals having a wide dynamic range. As a result, the instantaneous response of the optical signal receiving apparatus to the burst-like cell signals is deteriorated. In order to deal with this deterioration of the instantaneous response, it is necessary to secure a transient time region (period) until the gain stabilizes at the optimum value.

In the state where no cell signal has yet arrived, for example, the optical signal receiving apparatus waits on standby at the maximum gain. When a cell signal arrives during this standby state, the optical signal receiving apparatus first amplifies the input signal with its maximum gain and then lowers the gain if the level of the amplified signal is larger than the optimum value. It then waits for stabilization of the gain. Usually, at least 10 bits worth of time is necessary until the gain is stabilized. When the dynamic range of the cell signals becomes larger, the range of variation of the gain is enlarged and therefore the number of bits must be further increased. That is, the transient response region is increased.

Due to the above explained control of the gain at every time of reception of signal, there is sometimes an overshoot at each rising edge of the amplified signal from the later explained variable gain amplifier circuit. During the occurrence of this overshoot, the signal is not the inherent amplified signal, so it is difficult to correctly discriminate between the logics "1" and "0" at the following discrimination circuit.

The region of above difficulty of discrimination is the follow-up period up to the stabilization to the optimum gain, that is, a training period. In the related art, each cell signal has a data region for the training added to its front position as a header. A data region added as a header in this way does not contribute at all to the region of the cell signals for transfer of data as inherent information. In the end, therefore, there is a problem of a reduction of the transmission efficiency of the transmission system as a whole.

SUMMARY OF THE INVENTION

Accordingly, in consideration with the above problems, an object of the present invention is to provide an apparatus and method for detection of an optical signal capable of causing the gain to quickly stabilize at the optimum gain without accompanying transient response (overshoot) at the time of reception of each cell signal.

To attain the above object, the present invention provides an optical signal receiving apparatus capable of substantially instantaneously and stably discriminating the logic from the header of a burst-like optical signal. This apparatus comprises a pre-amplifier circuit for amplifying an output from a photodiode receiving cell signals, a dummy side variable gain amplifying unit for performing the gain control by feedback control with respect to the output from the pre-amplifier circuit and outputting the gain at that time as gain information, a memory unit for holding the gain information, and a signal side variable gain amplifying unit for performing the gain control by feedfoward control by using the gain set by the gain information and outputting the amplified signal.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the related art and the disadvantages therein will be described with reference to the related figures.

Figure 19:
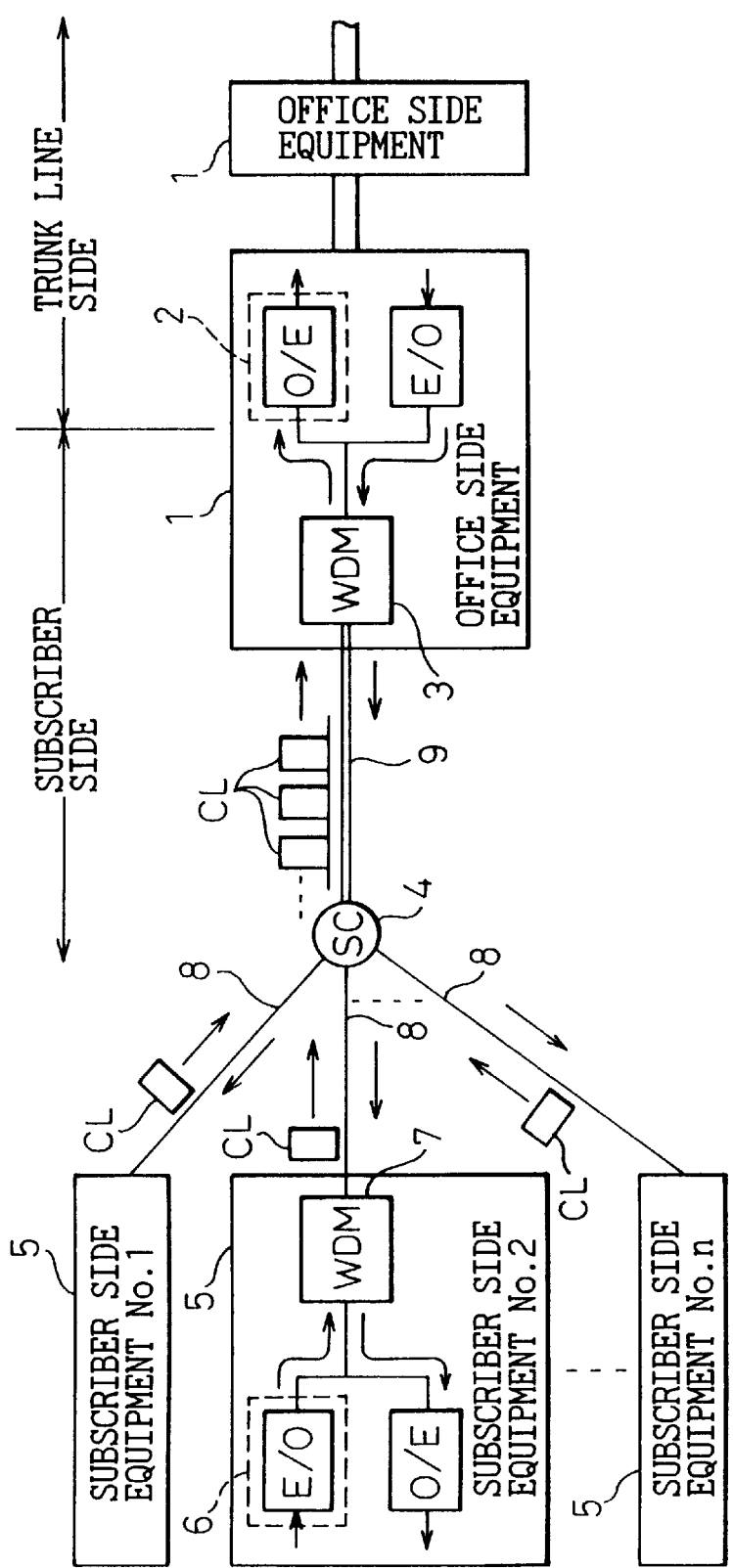
FIG. 19 is a view schematically showing an example of the transmission system to which the present invention is applied.

FIG. 19 is a view schematically showing an example of a transmission system to which the present invention is applied, that is, the PON transmission system explained before.

In the figure, 1 denotes office side equipment which constitutes a trunk line side in cooperation with the other office side equipment 1 shown at the right side in the figure. On the other hand, the equipment 1 constitutes a subscriber side in cooperation with a plurality of units of subscriber side equipment (#1, #2 . . . #n) 5 shown at the left side in the figure. The present invention relates to the latter subscriber side.

At the subscriber side, a downstream optical transmission is performed from the office side equipment 1 to each subscriber side equipment 5, while the reverse upstream optical transmission is performed from each subscriber side equipment 5 to the office side equipment 1. The present invention relates to the latter upstream optical transmission.

This upstream optical transmission is carried out by transmitting cell signals CL from an optical transmission unit (indicated by electrical/optical converter "E/O" in the figure) 6 in each subscriber side equipment 5 and a wavelength division multiplexer (WDM) 7 provided with a filtering function for preventing mutual interference with the downstream optical transmission. Cell signals CL pass through individual optical fiber transmission lines 8, the optical splitter (star coupler SC) 4, and a common optical fiber transmission line 9 common to the plurality of units of subscriber side equipment 5 to reach the office side equipment 1. On this common optical fiber transmission line 9, cell signals CL from the units of subscriber side equipment 5 are transferred in bursts. Note that, in the downstream transmission from the office side equipment 1 to the subscriber side equipment 5, continuous cell signal trains are sent through the transmission lines 9 and 8.

In the upstream optical transmission, the burst-like cell signals CL reaching the office side equipment 1 are received at the receiving apparatus (indicated by the optical/electrical converter "O/E") 2 via the wavelength division multiplexer (WDM) 3 in the office side equipment 1. There, the logics "1" and "0" of the data contained in each cell signal CL is discriminated. The present invention will describe this optical receiving unit 2. This will be referred to as the "optical signal receiving apparatus". In this apparatus, the optical cell signals are received in bursts.

Figure 20:
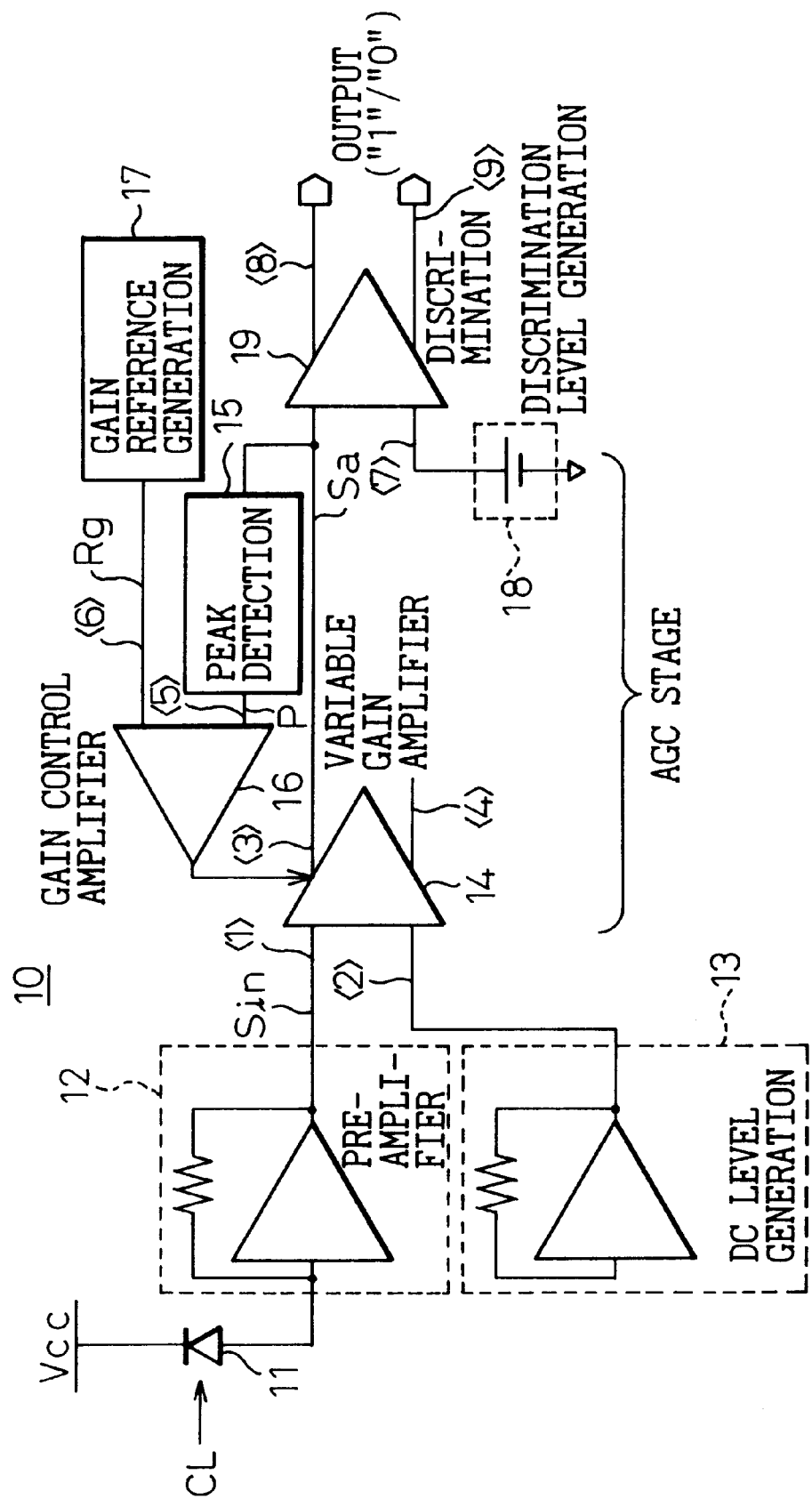
FIG. 20 is a view of the configuration of an optical signal receiving apparatus of the related art.

FIG. 20 is a view of the configuration of an optical signal receiving apparatus of the related art. Optical cell signals CL from the subscriber side are first received at a photodiode 11 located at an input stage of the optical signal receiving apparatus 10, converted to electrical cell signals there, and further pass through a pre-amplifier circuit 12. Automatic gain control is applied to the amplitude of each cell signal at an intermediate AGC stage resulting in cell signals having a substantially constant amplitude. The discrimination circuit 19 located at an output stage of the optical signal receiving apparatus 10 discriminates the logics "1" and "0" forming each cell signal and provides a complementary digital output ("1"/"0"). Note that this digital output is given to for example a latter retiming circuit (not illustrated) for establishing bit synchronization.

Figure 21:
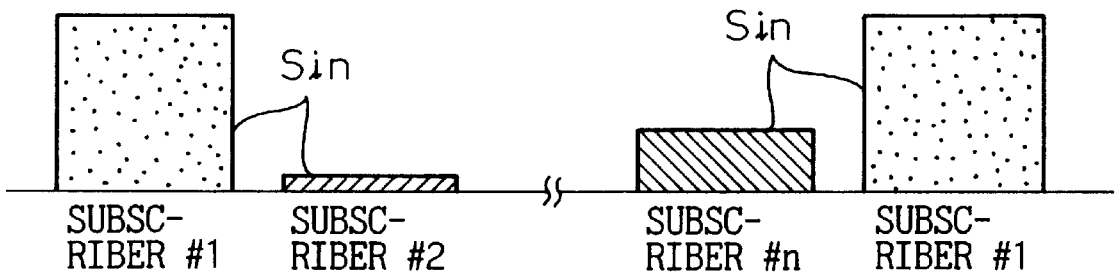
FIG. 21 is a view of an example of the waveform of an input signal $S_{in}$ applied to an AGC stage.

FIG. 21 is a view of an example of the waveform of the input signal $S_{in}$ applied to the AGC stage. Cell signals from the units of subscriber equipment 5 (#1, #2 . . . #n) shown in FIG. 19 have different transmission losses as mentioned above, therefore the magnitude of amplitude of each is different. In this way, even if the discrimination circuit 19 discriminates the logics "1" and "0" of the input signals $S_{in}$, each having different amplitudes, by a fixed discrimination level (threshold) from a discrimination level generating circuit 18, correct discrimination cannot be carried out.

Therefore, in FIG. 20, the input signals $S_{in}$ from the pre-amplifier circuit 12 are all made to have the same amplitude for all of input signals from the subscribers so as to enable correct discrimination. This is done by the AGC stage.

The AGC stage, as shown in FIG. 20, is constituted by a variable gain amplifier circuit 14 receiving the input signal $S_{in}$, a peak detection circuit 15 forming a feedback loop with respect to this circuit 14, a gain control amplifier circuit 16, and a gain reference generating circuit 17.

The peak detection circuit 15 constantly monitors the amplified signal Sa from the variable gain amplifier circuit 14 and detects the peak value thereof. In order to make this detected peak value P converge to the gain reference Rg given from the gain reference generating circuit 17, a gain control amplifier circuit 16 is provided. This circuit 16 controls the gain of the variable gain amplifier circuit 14 based on the peak value P and the gain reference Rg. An AGC feedback loop is formed here.

Figure 22:
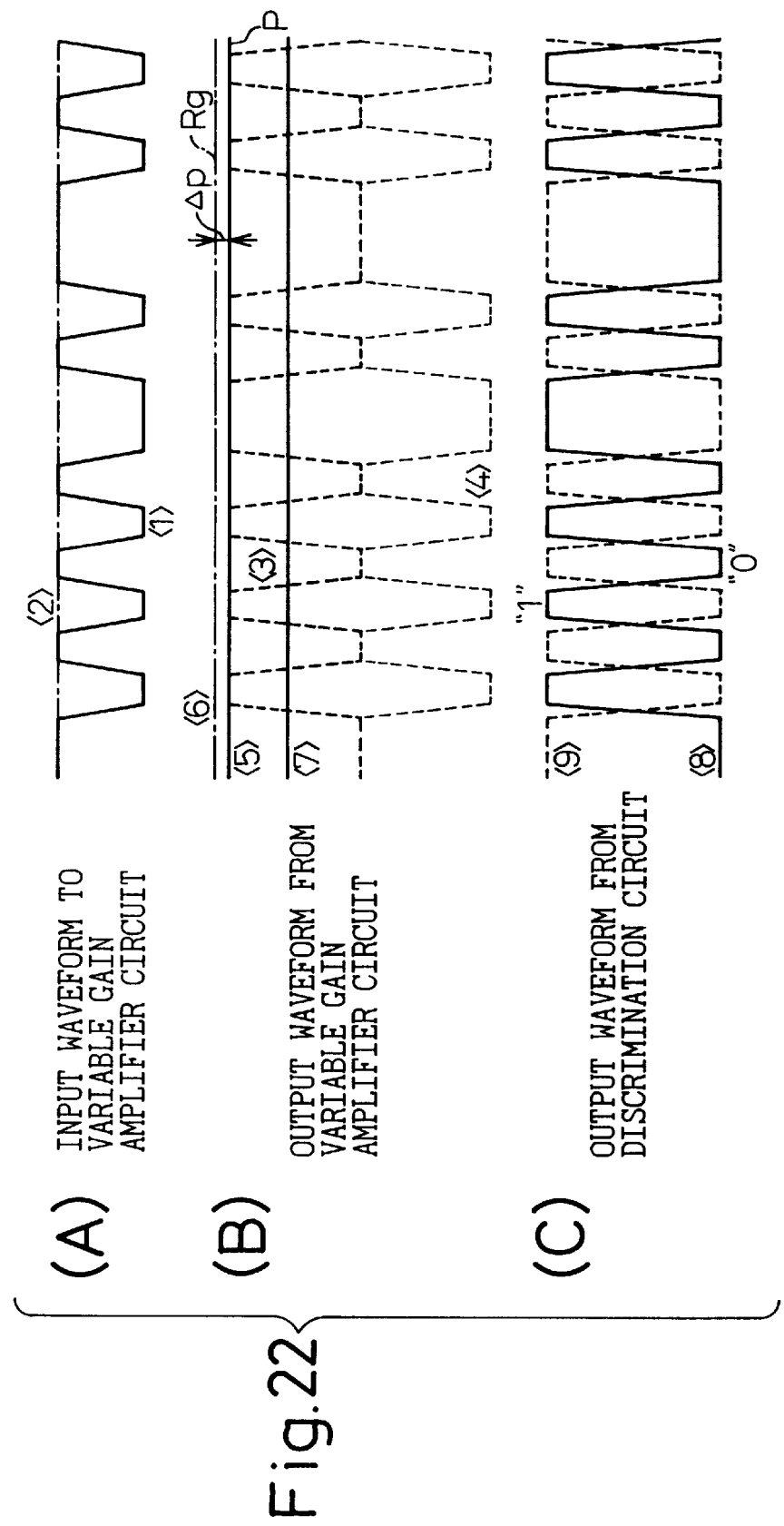
FIG. 22 is a waveform diagram of signals of principal parts in FIG. 20, in which (A) and (B) are views of an input waveform to and output waveform from a variable gain amplifier circuit 14, and (C) is a view of the output waveform of a discrimination circuit 19.

FIG. 22 shows the waveforms of signals of principal parts in FIG. 20, in which (A) and (B) are views of the input waveform and output waveform of the variable gain amplifier circuit 14 and (C) is a view of the output waveform of the discrimination circuit 19. Note that the waveforms of the parts <1>, <2>, ... <9> in FIG. 20 are indicated by the corresponding numbers <1>, <2>, ... <9> in FIG. 22.

The waveform <1> in (A) of FIG. 22 is the waveform of the input signal $S_{in}$ and the inverted output waveform of the photodiode 11. A DC level generating circuit 13 supplies the level <2> substantially equal to the "0" level of this waveform <1> to the variable gain amplifier circuit.

The variable gain amplifier circuit 14 receiving the inputs shown in the above <1> and <2> outputs the complementary amplified signal Sa shown in (B) of the same figure as the waveforms <3> and <4>. The peak value P of the amplified signal Sa having the waveform <3> is detected at the peak detection circuit 15. This is the waveform <5>. This peak value P is controlled via the variable gain control amplifier circuit 16 so that the difference Δp from the gain reference Rg from the gain reference generating circuit 17 indicated by the waveform <6> always converges to 0. Namely, AGC feedback control is carried out so that the peak value P coincides with the gain reference Rg. Thus, the input signals $S_{in}$ all become the amplified signal Sa maintained at a constant amplitude irrespective of from which subscriber the signal is sent.

The logics "1" and "0" contained in the amplified signal Sa are discriminated at the discrimination circuit 19. The result becomes as shown in (C) of the same figure. Note that an alternating pattern of "1" and "0" is shown as one example.

Figure 23:
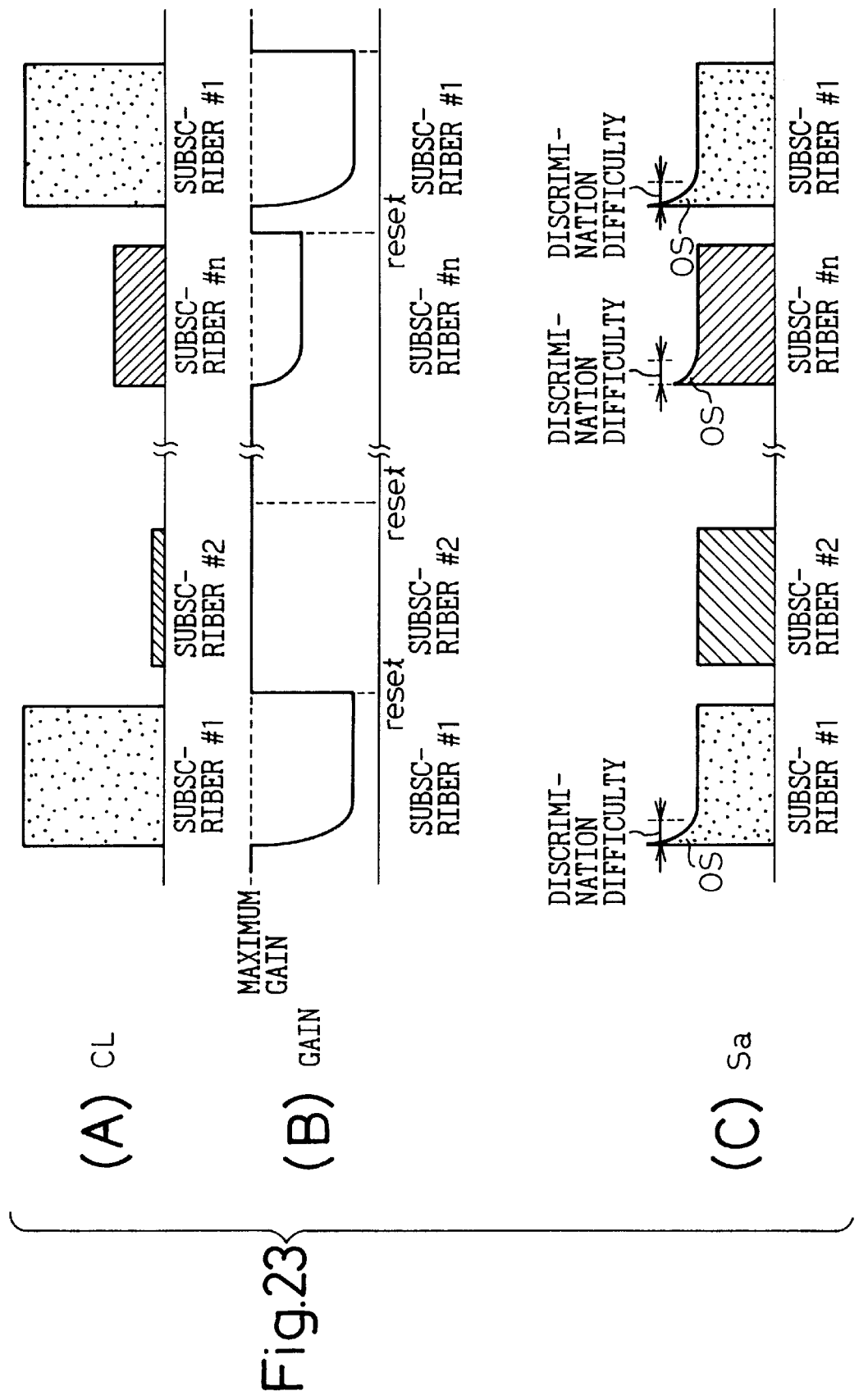
FIG. 23 is a view for explaining the problems of the related art, in which (A) is a view of the cell signals CL, (B) is a view of the gain, and (C) is a view of an amplified signal Sa.

FIG. 23 is a view for explaining the problems of the related art mentioned above, and in which (A) is a view of the cell signals CL, (B) is a view of the gain, and (C) is a view of the amplified signal Sa. Namely, (A) shows the input waveform to the photodiode 11, (B) a gain of the variable gain amplifier circuit 14, and (C) the output waveform of the circuit 14. Note that (A) is equivalent to FIG. 21 explained above.

As shown in (A) of FIG. 23, the optical signal receiving apparatus 10 receives cell signals CL having different amplitude levels for every subscriber in bursts, therefore the apparatus 10 is required to instantaneously determine the optimum state of reception for each amplitude of incoming cell signals CL, that is, the optimum gain.

As explained above, however, in order to handle burst-like cell signals having a wide dynamic range, the range of variation of the gain control in the optical signal receiving apparatus 10 must be made considerably large. As a result, the instantaneous response with respect to the burst-like cell signals of the optical signal receiving apparatus 10 is deteriorated. In order to deal with such a deterioration of the instantaneous response, it is necessary to secure a transient time region (period) until the gain is stabilized to the optimum value.

Referring to (B) of FIG. 23, in the state where no cell signal has yet arrived, for example, the optical signal receiving apparatus 10 waits on standby at the maximum gain ("maximum gain" in the figure). When a cell signal CL arrives in this standby state, the optical signal receiving apparatus 10 first amplifies the input signal $S_{in}$ with its maximum gain and then lowers the gain if the level of the amplified signal Sa is larger than the optimum value. Then, it waits for stabilization of the gain. Usually, at least 10 bits worth of time is necessary until the gain is stabilized. When the dynamic range of the cell signals becomes larger, the range of variation of the gain is enlarged and therefore the number of bits must be further increased. That is, the transient response region is increased. Note that, in (B) of FIG. 23, in a state where no cell signal CL has yet arrived, the case of waiting on stand-by at a maximum gain is shown, but conversely it is also possible to wait on stand-by at the minimum gain. In any case, each time the reception of a cell signal is completed, the gain is set again to the maximum or minimum gain (refer to "reset" of (B) in the figure).

Since the gain is controlled at the time of each signal reception as explained above, there is sometimes an overshoot (OS), shown in (C) of FIG. 23, at each rising edge of the amplified signal Sa from the variable gain amplifier circuit 14. During the period when this overshoot occurs, the signal is not the inherent amplified signal Sa, so it is difficult to correctly discriminate between the logics "1" and "0" at the following discrimination circuit 19 ("discrimination difficulty" in the figure).

The region of the above discrimination difficulty is a follow-up period until stabilization to the optimum gain, that is, a training period. In the related art, each cell signal CL has a data region for the training added to its front position as a header. The data region added as the header in this way does not contribute at all to the region of the cell signals CL for transfer of data as inherent information. In the end, there is the aforementioned problem of a reduction of the transmission efficiency of the entire transmission system.

Accordingly, the present invention provides an apparatus and method for reception of an optical signal capable of quickly stabilizing the gain to the optimum gain without accompanying transient response (overshoot) at the time of reception of each cell signal.

Figure 1:
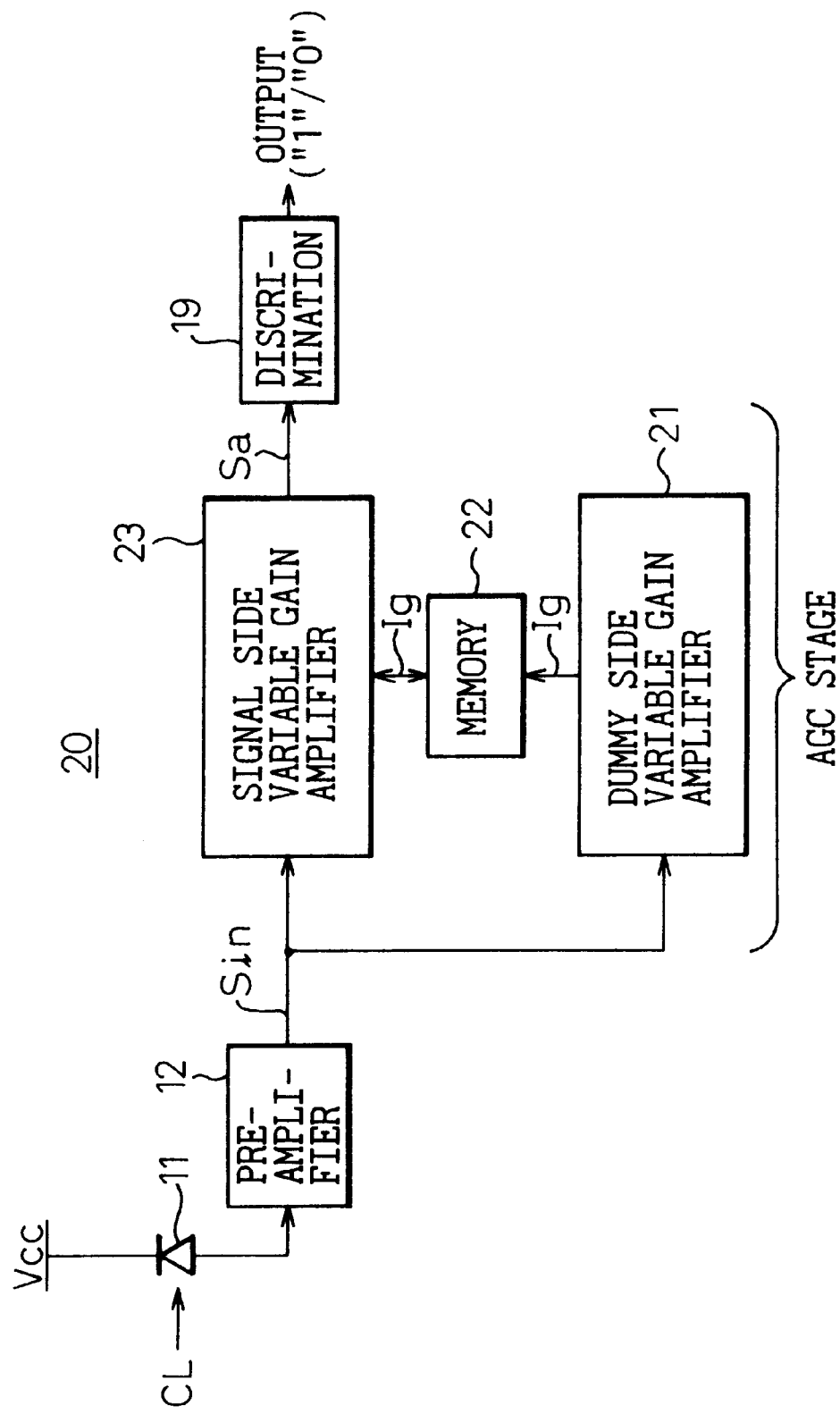
FIG. 1 is a view of the basic configuration of the present invention.

FIG. 1 is a view of the basic configuration of the present invention. Note that similar constituent elements are indicated by the same reference numerals or symbols throughout all of the figures. Accordingly, the constituent elements introduced by the optical signal receiving apparatus 20 according to the present invention shown in the figure are a dummy side variable gain amplifying unit 21, a memory unit 22, and a signal side variable gain amplifying unit 23.

This optical signal receiving apparatus 20 comprises the following constituent elements as a whole. Namely, it comprises:

a pre-amplifier circuit 12 for amplifying the output from a photodiode 11 receiving the cell signal CL transmitted from each subscriber;

a dummy side variable gain amplifying unit 21 for receiving the output, as an input signal $S_{in}$, from the pre-amplifier circuit 12, performing a gain control with respect to the output by feedback control and outputting the gain control signal, as the gain information Ig, when a dummy amplified signal having a predetermined output amplitude is generated;

a memory unit 22 for holding the gain information Ig; and a signal side variable gain amplifying unit 23 for receiving the output, as an input signal $S_{in}$, from the pre-amplifier circuit 12, performing a gain control with respect to the output by feedfoward control by using the gain set by the gain information Ig from the memory unit 22 and outputting the amplified signal Sa having the predetermined output amplitude.

Figure 2:
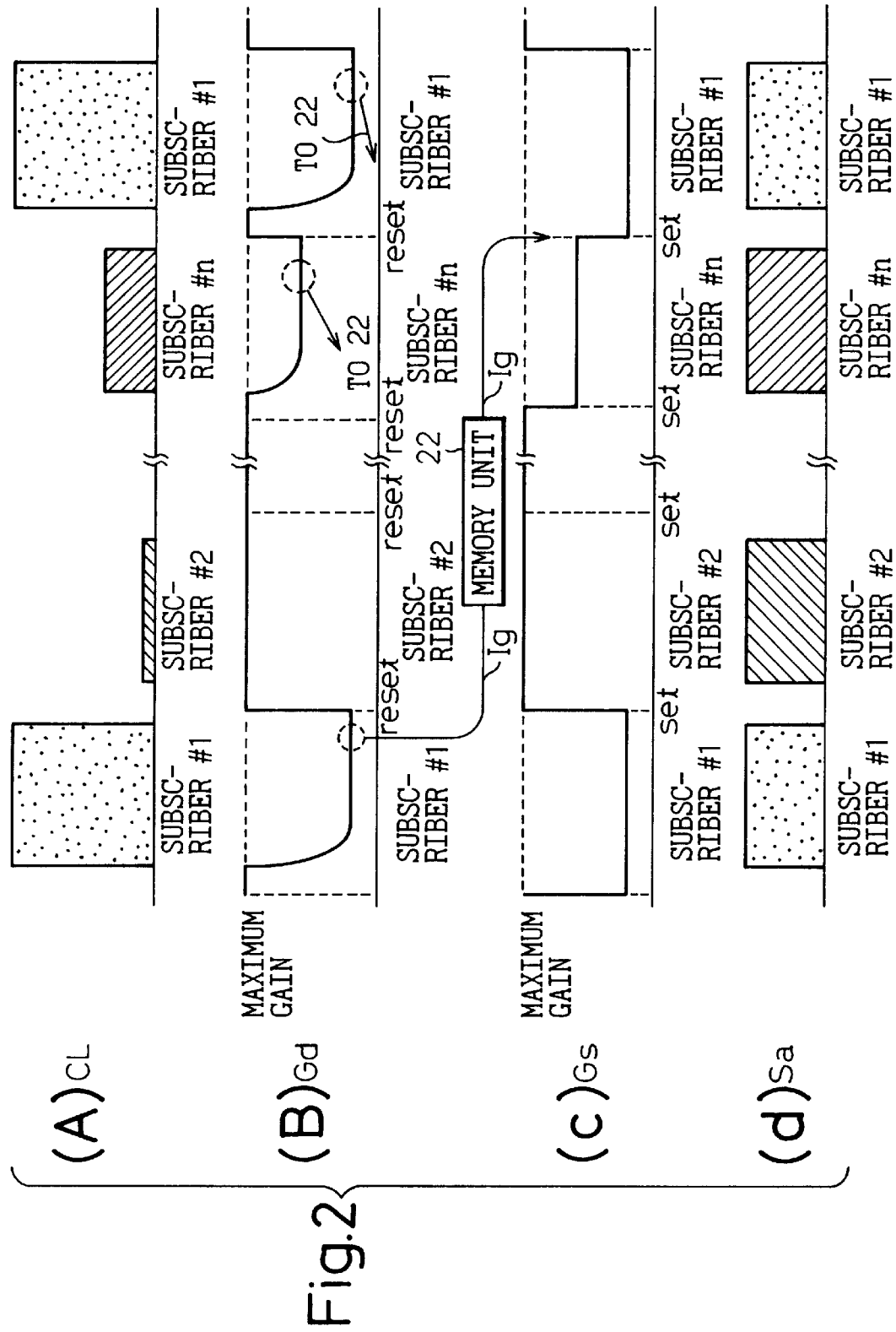
FIG. 2 is a view for explaining the principle of the present invention.

FIG. 2 is a view explaining the principle of the present invention, in which (A) shows the cell signals, (B) shows the dummy side gain, (C) shows the signal side gain, and (D) shows the amplified signal. Note that, (A), (B), and (D) of the figure correspond to (A), (B), and (D) of FIG. 23 mentioned above.

Assume that the cell signals CL as shown in (A) of FIG. 2 are transmitted from the subscribers (#1, #2 . . . #n) at timings (time slots) assigned to respective subscribers. The amplitude of each cell signal CL is different due to individual transmission loss of each subscriber.

When such a cell signal CL is once amplified at the pre-amplifier 12 to obtain the input signal $S_{in}$ and then the amplified signal Sa is produced which has the predetermined output amplitude at the variable gain amplifying circuit 14 of the related art, as shown in (C) of FIG. 23, an overshoot OS occurs making correct discrimination of the logic difficult. Therefore, it is required to quickly stabilize the gain to the predetermined optimum gain.

(B) of FIG. 2 shows the variation of the gain Gd in the dummy side variable gain amplifying unit 21 shown in FIG. 1. This is exactly the same as the variation of the gain in the optical signal receiving apparatus 10 of the related art explained by referring to (B) of FIG. 23. Here, the reason for use of the term "dummy side" is that the amplified signal (dummy amplified signal) produced in this variable gain amplifying unit 21 is not used as the signal to be discriminated in the following discrimination circuit 19, i.e., it is not utilized as an inherent amplified signal.

However, the gain information Ig concerning the gain Gd obtained at this dummy side variable gain amplifying unit 21, particularly, a stable gain Gd obtained near the end of each cell signal CL, is effectively utilized as the gain information Ig. For example, for the cell signal CL from the subscriber #1 of (B) of FIG. 2, the stable gain Gd is picked up as indicated by the broken line circle in (B) in the latter half of the cell signal and stored and held in an area corresponding to the subscriber #1 in the memory unit 22 as the gain information Ig.

In the PON transmission system, however, the office side equipment 1 has predetermined sequence information. This sequence information determines the sequence of from which subscriber (#1, #2 . . . #n) and at which timing (time slot) the cell signal CL is to be transmitted.

Then, as shown in (A) of FIG. 2, it is known from the sequence information that the optical signal receiving apparatus 20 receives the cell signal CL from for example the subscriber #1 at the timing shown at the left end in the figure and receives the next cell signal CL from the subscriber #1 at the timing shown at the right end in the figure. Therefore, since it is seen that the cell signal CL from the subscriber #1 is received at the timing shown at the right end in the figure, as shown in (C) of the figure, at the start of the timing, the stabilized gain Gd shown in (B) of the figure learned at the time of reception of the cell signal CL received immediately before, is read from the memory unit 22 as the gain information Ig. This Gd is set as the gain of the signal side variable gain amplifying unit 23 (refer to "set" of (C) of the figure).

Thus, as shown in (C) of FIG. 2, the gain for obtaining the amplified signal Sa having the predetermined output amplitude in the optical signal receiving apparatus 20 becomes substantially the optimum gain from the start of each burst.

Here, looking at the same subscriber, note is taken of the fact that the optimum gain obtained at immediately preceding burst timing does not change so much from the optimum gain which will be obtained at the current burst timing.

As a result, the obtained amplified signal Sa becomes as shown in (D) of FIG. 2. As seen here, the problem of the overshoot OS appearing at the start of each burst shown in (C) of FIG. 23 is solved.

The above principle of the present invention can be applied to a method of receiving an optical signal.

Figure 3:
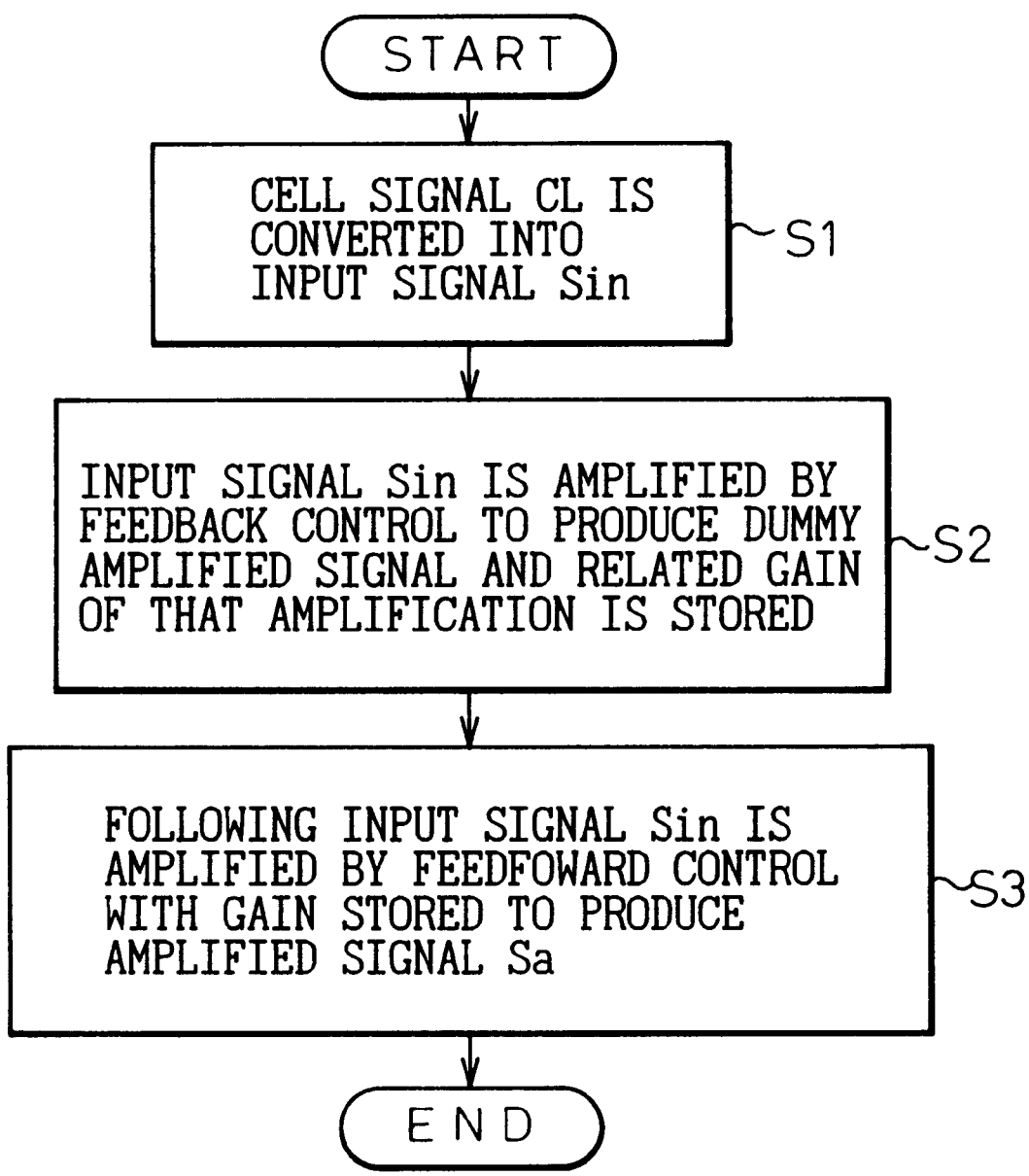
FIG. 3 is a step diagram showing a method for reception of an optical signal according to the present invention.

FIG. 3 is a step diagram of the method of receiving an optical signal according to the present invention. This includes the following three steps:

Step S1: Reception of the optical cell signal CL at the photodiode 11 and conversion to an electrical input signal $S_{in}$.

Step S2: Amplification of the input signal $S_{in}$ with a variable gain Gd by the feedback control, production of a dummy amplified signal having a predetermined output amplitude, and storage of gain information Ig indicating the gain.

Step S3: Amplification of the subsequently received input signal $S_{in}$ with the gain Gd indicated by the gain information Ig by feedfoward control and generation of an amplified signal Sa having a predetermined output amplitude.

The optical signal receiving apparatus 20 further has a discrimination circuit 19 which receives as its input the amplified signal Sa output from the signal side variable gain amplifying unit 23 as shown in FIG. 1, discriminates the logics "1" and "0" of this amplified signal Sa, and produces a digital output.

Figure 4:
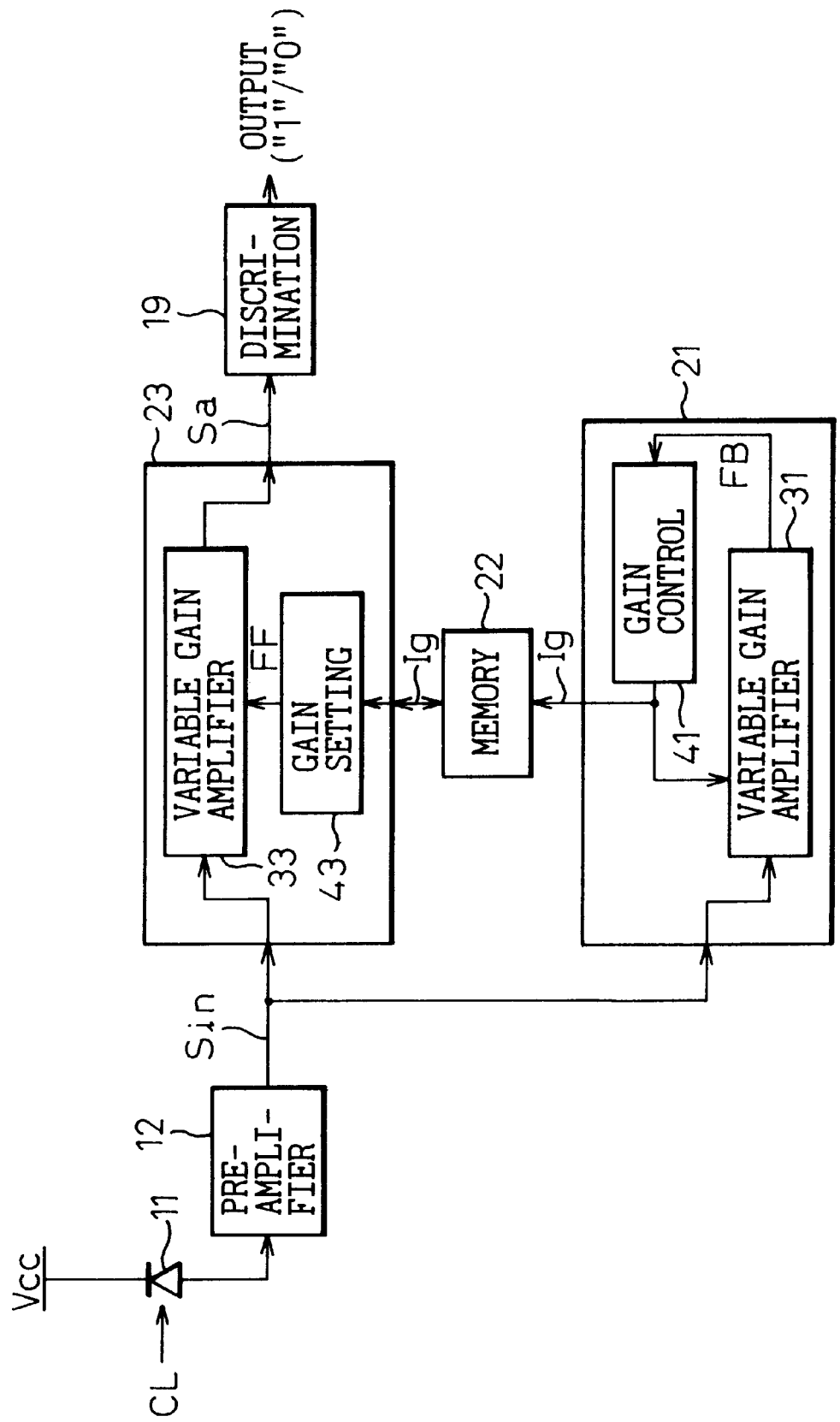
FIG. 4 is a view more concretely showing amplifying units 21 and 23 shown in FIG. 1.

FIG. 4 is a view showing the amplifying units 21 and 23 shown in FIG. 1 in more detail. In the figure, the dummy side variable gain amplifying unit 21 comprises a dummy side variable gain amplifier circuit 31 which receives and amplifies the input signal $S_{in}$ and a dummy side gain control amplifier circuit 41 for forming a feedback loop FB with respect to this dummy side variable gain amplifier circuit 31. It outputs the gain Gd given from this dummy side gain control amplifier circuit 41 to the dummy side variable gain amplifier circuit 31 to the memory unit 22 as the gain information Ig.

On the other hand, the signal side variable gain amplifying unit 23 comprises a variable gain amplifier circuit 33 which receives and amplifies the input signal $S_{in}$ and a gain setting unit 43 which reads the gain information Ig held in the memory unit 22 and sets the gain Gs by a feedfoward (FF) control with respect to this variable gain amplifier circuit 33.

Figure 5:
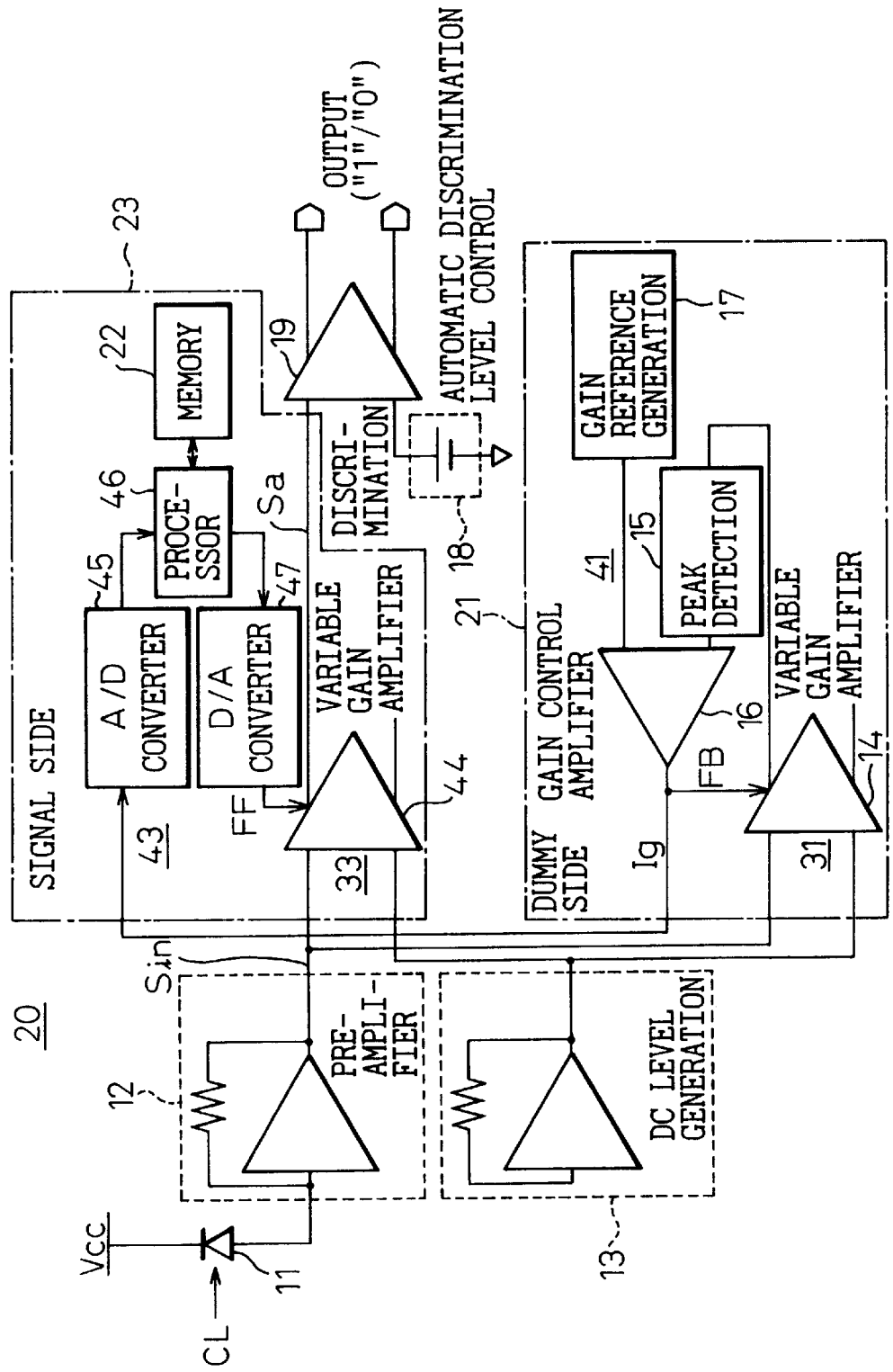
FIG. 5 is a view of a further concrete first embodiment of the circuit configuration shown in FIG. 4.

FIG. 5 is a view of a more specific first embodiment of the circuit configuration shown in FIG. 4.

First, looking at the dummy side variable gain amplifying unit 21, the dummy side variable gain amplifier circuit 31 of FIG. 4 and the dummy side gain control amplifier circuit 41 are disposed at positions indicated by reference numerals 31 and 41 in FIG. 5, respectively. As apparent when compared with the above FIG. 20, the dummy side variable gain amplifying unit 21 has exactly the same configuration as that of the AGC stage in the optical signal receiving apparatus 10 of the related art. Note that the dummy side variable gain amplifying unit 21 according to the present invention is configured to supply the gain information Ig to the signal side variable gain amplifying unit 23 side.

Next, looking at the signal side variable gain amplifying unit 23, the variable gain amplifier circuit 33 and gain setting unit 43 of FIG. 4 are disposed at positions indicated by reference numerals 33 and 43 in FIG. 5, respectively.

The variable gain amplifier circuit 33 is constituted by the variable gain amplifier circuit 44 comprising a differential amplifier circuit as illustrated. Further, the gain setting unit 43 comprises an A/D converter 45, a processor 46, and a D/A converter 47.

In more detail, the signal side variable gain amplifying unit 23 includes the memory unit 22 and, at the same time, has an A/D converter 45 for converting analog gain information Ig to digital gain information Ig, a processor 46 for writing the digital gain information Ig from this A/D converter 45 into the memory unit 22, and a D/A converter 47 for converting the gain information read from the memory unit 22 via this processor 46 to analog gain information.

The processor 46 accesses the memory unit 22 whenever a cell signal CL is received and, at the same time, reads the gain information Ig held immediately before for the related subscriber when receiving a cell signal CL from each subscriber according to the above sequence information held in it or the above sequence information given from the outside and sets the gain of the circuit 33 in the signal side variable gain amplifying unit 23.

Figure 6:
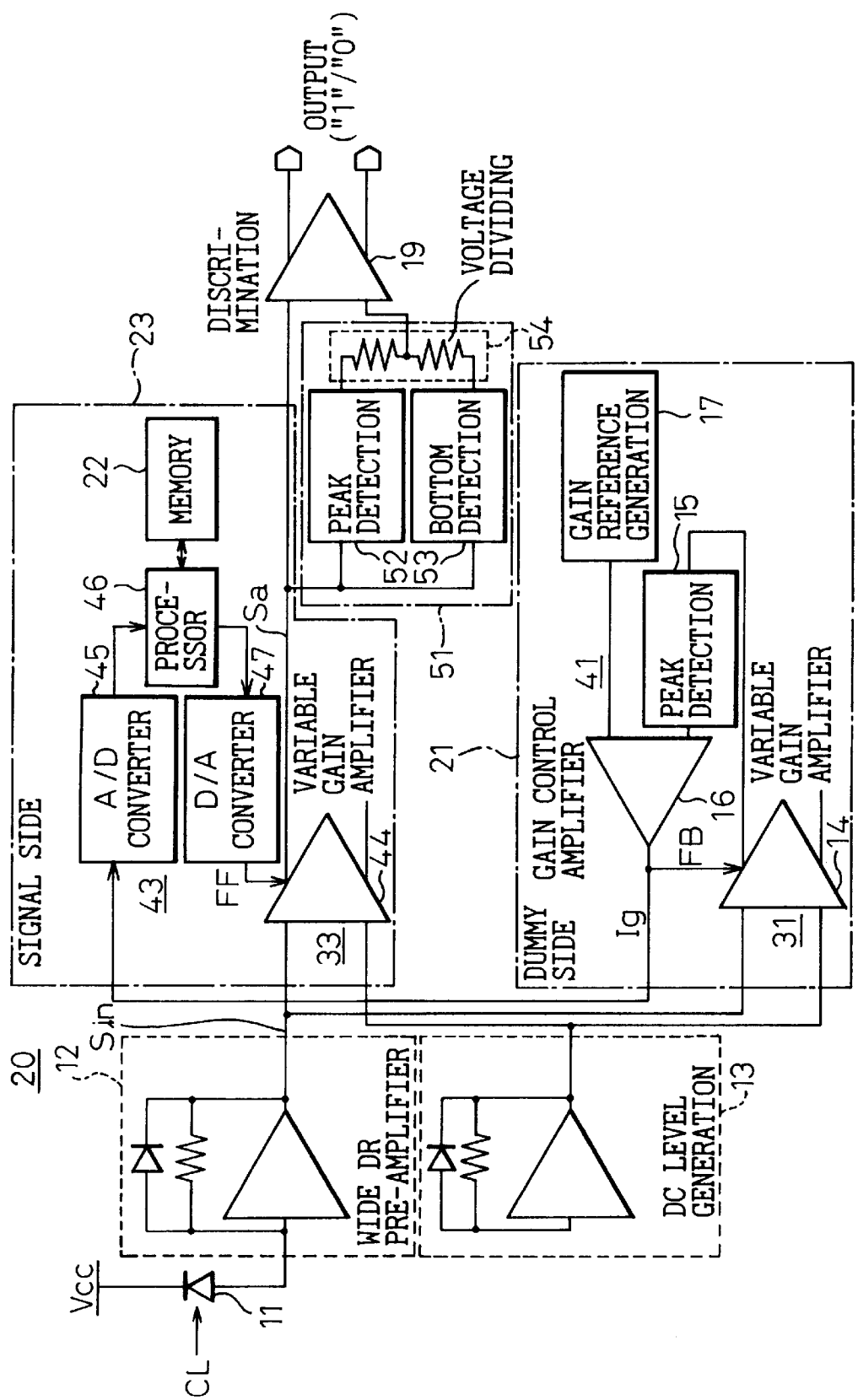
FIG. 6 is a view of a second embodiment according to the present invention.

FIG. 6 is a view of a second embodiment according to the present invention. The difference from the above first embodiment resides in that an automatic discrimination (threshold) level control means 51 for giving a discrimination level to discriminate the logics "1" and "0" of the amplified signal Sa, is added to the discrimination circuit 19. The automatic discrimination level control means 51 provides not a fixed discrimination level, but a variable discrimination level. More specifically, as shown in FIG. 6, it comprises a peak detection circuit 52 and a bottom detection circuit 53 for respectively detecting the maximum level and minimum level of the amplified signal Sa output from the signal side variable gain amplifying unit 23 and a voltage dividing circuit 54 for producing a substantially intermediate voltage of the output voltages from the peak detection circuit 52 and the bottom detection circuit 53 and using the voltage as the variable discrimination level. These form an ATC (automatic threshold control) circuit as a whole and enable a further improvement of the precision of the logic discrimination operation. This will be explained using FIG. 7.

Figure 7:
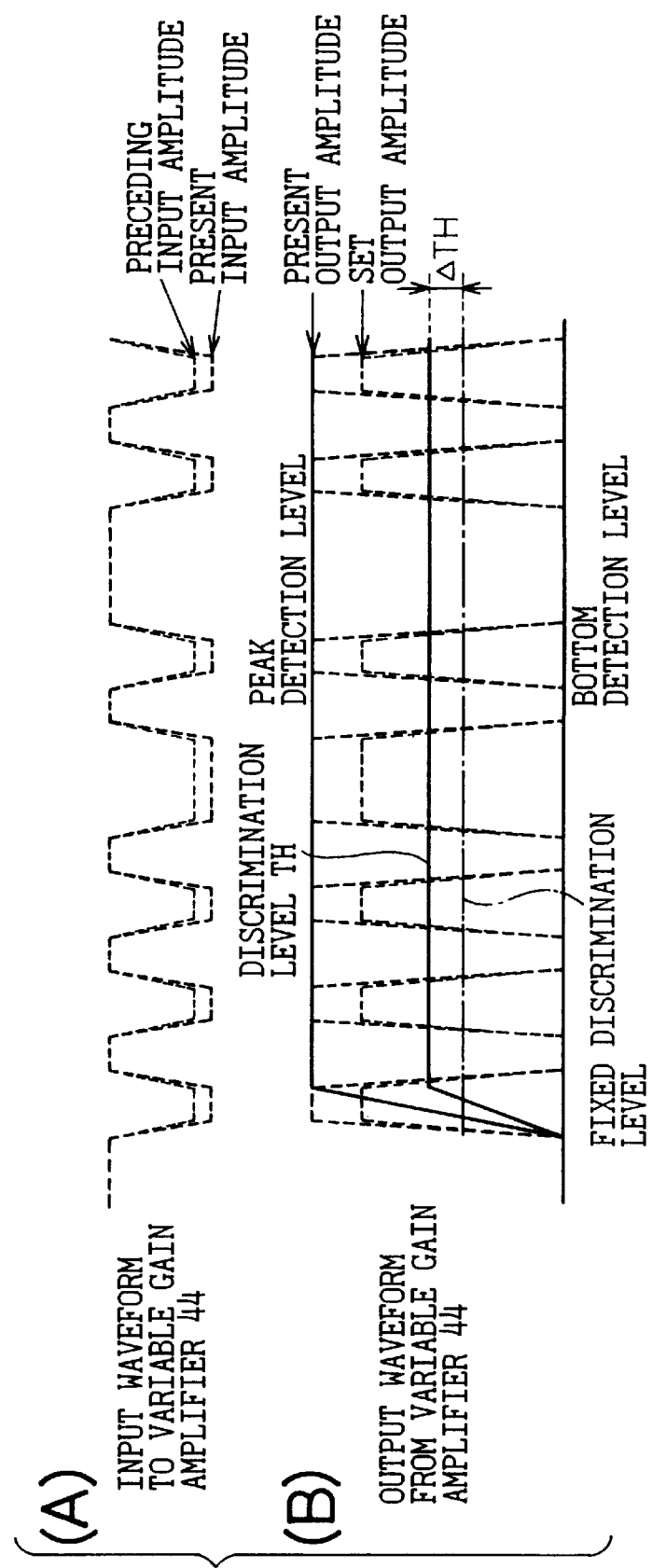
FIG. 7 is a view for explaining a discrimination level generating means 51, in which (A) and (B) are input waveform and output waveform diagrams of a variable gain amplifier circuit 44.

FIG. 7 is a view for explaining the automatic discrimination level control means 51. (A) and (B) are views of the input waveform and output waveform of the variable gain amplifier circuit 44. Referring to (A) of the figure, there is sometimes a discrepancy in the amplitude of the input waveform ($S_{in}$) of the variable gain amplifier circuit 44 between the previous burst timing and current burst timing. This may be caused for example by an abrupt change of the loss of the transmission line and an abrupt change of the ambient temperature.

As shown in (B) of the figure, there is a discrepancy between the set output amplitude in the figure (output amplitude of the amplified signal Sa) set according to the previous gain information Ig and the actual output amplitude (current output amplitude). In the example of the figure, it shifts to a higher level. Needless to say a similar operation is performed even in a case where the amplitude shifts to a lower level.

In such a case, when discriminating the logic with the fixed discrimination level as shown in the first embodiment (FIG. 5), the level deviates (ΔTH) from the ideal discrimination level which is the center value of the amplitude (between peak and bottom). In the example of the figure, the ideal discrimination level is the discrimination level TH shifted upward by the amount of ΔTH.

In order to produce this ideal discrimination level TH, the peak detection level corresponding to the above peak and the bottom detection level corresponding to the above bottom are found at the peak detection circuit 52 and the bottom detection circuit 53 shown in FIG. 6, respectively. A predetermined divided value in voltage between the peak detection level and the bottom detection level is found at the voltage division circuit 54 to obtain the ideal discrimination level. The dividing value is preferably ½.

Note that at the point of time when the amplified signal Sa is output from the signal side variable gain amplifier circuit 44, the signal is sufficiently amplified. Also, the dynamic range of amplitude is small. Therefore, the error of the peak detection value is small. Further, this peak detection can be sufficiently started up in about 1 bit's worth of time, so there is almost no effect in lowering the transmission efficiency.

Further, in this second embodiment, while a pre-amplifier circuit of wide dynamic range (DR) is used as the pre-amplifier circuit 12, it is also possible to use a usual pre-amplifier circuit as in the first embodiment (FIG. 5).

Furthermore, common to all of the embodiments, provision is made of a DC level generating circuit 13 for applying a DC level substantially equal to an output level corresponding to the logic "0" from the pre-amplifier circuit 12 at one of the differential inputs of the dummy side variable gain amplifier circuit 14.

Further, provision is made of a DC level generating circuit 13 for applying a DC level substantially equal to an output level corresponding to the logic "0" from the pre-amplifier circuit 12 at one of differential inputs of the variable gain amplifier circuit 44.

Preferably, a single circuit is used commonly for these two DC level generating circuits.

Figure 8:
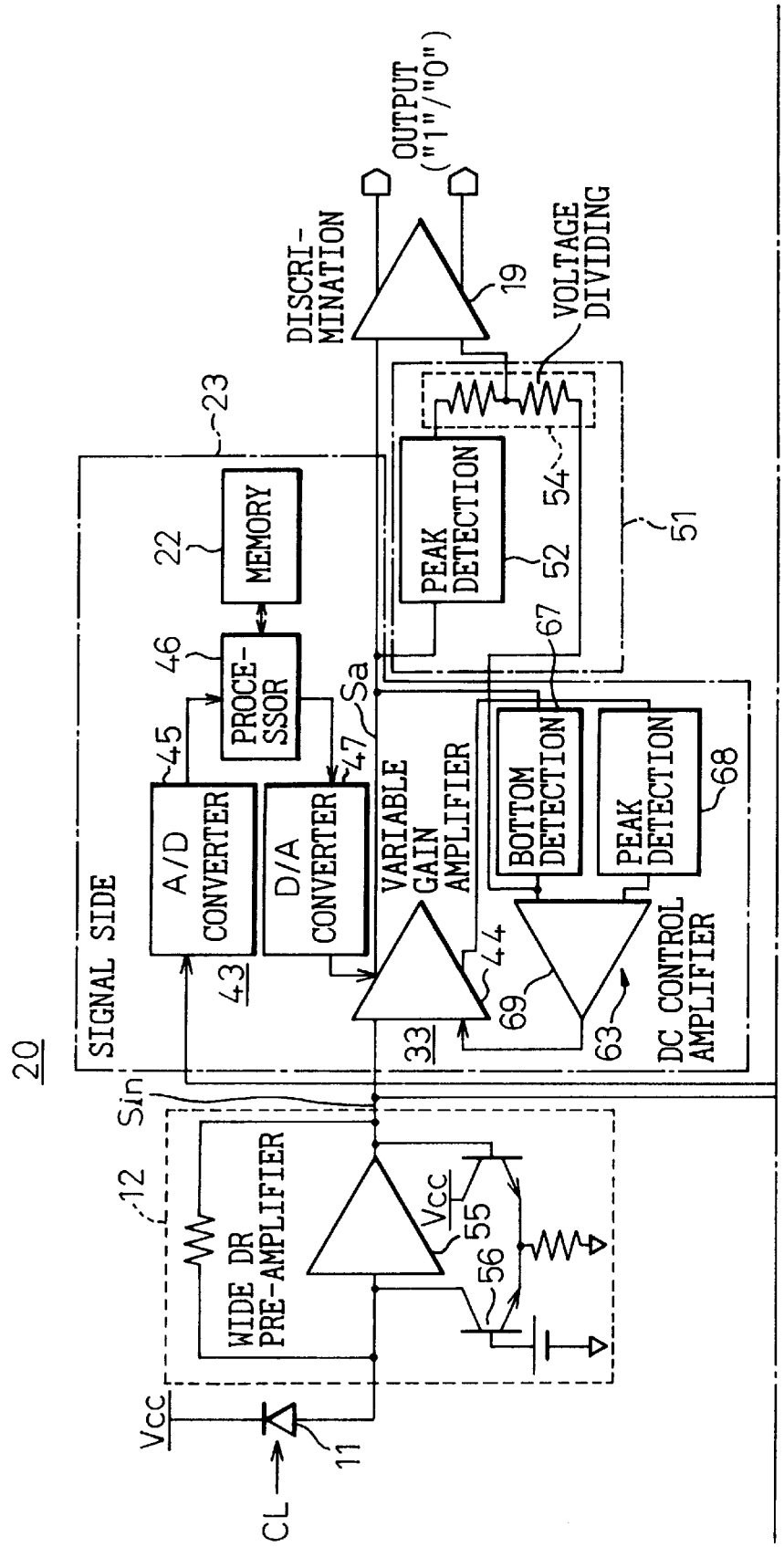
FIG. 8 is a first part of a view of a third embodiment according to the present invention.
Figure 9:
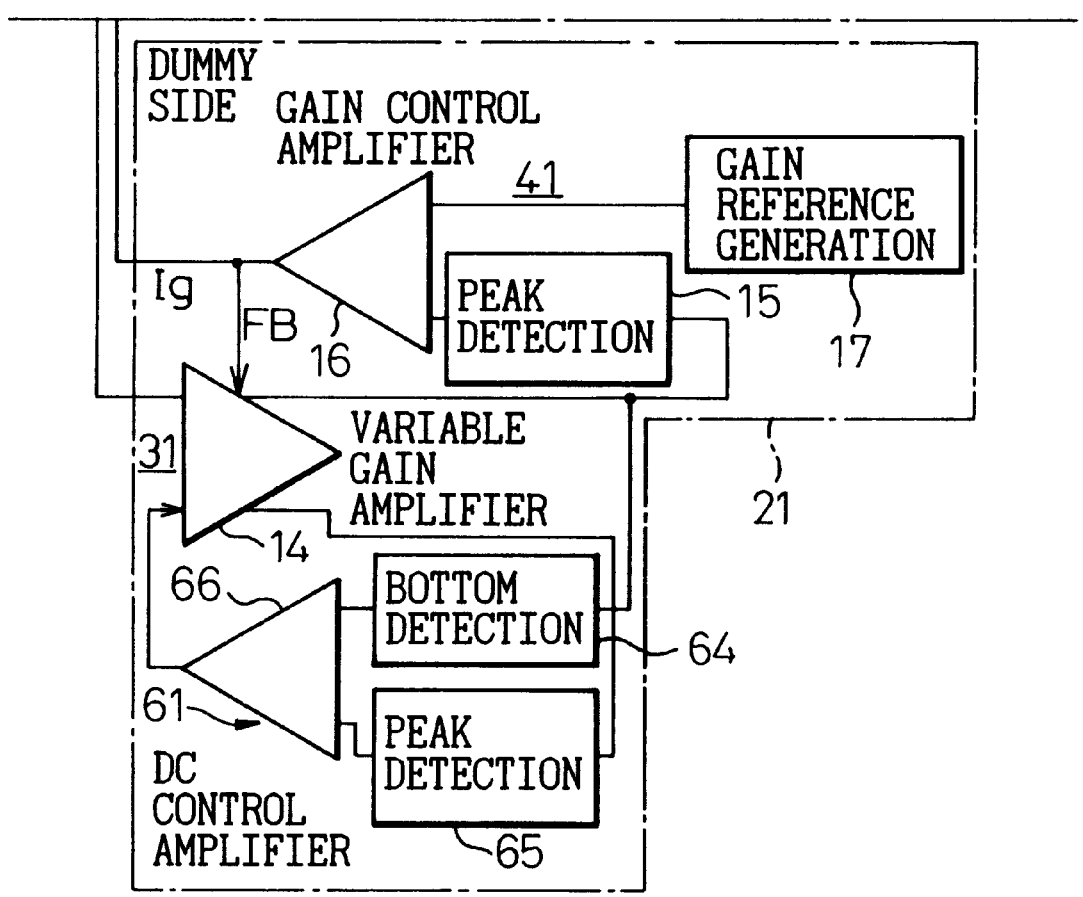
FIG. 9 is a second part of a view of the third embodiment according to the present invention.

FIG. 8 and FIG. 9 are first and second parts of a view of a third embodiment according to the present invention.

In the embodiment, a modification of the DC level generating circuit (13) is shown. The DC level generating circuit supplies a fixed reference voltage at one of differential inputs of the differential amplifier circuits forming the variable gain amplifier circuits 14 and 44. However, if the reference voltage is fixed, there is sometimes an inconvenience due to an offset peculiar to the differential amplifier circuit and error of the DC level generating circuit per se. This will be explained by referring to FIG. 10.

Figure 10:
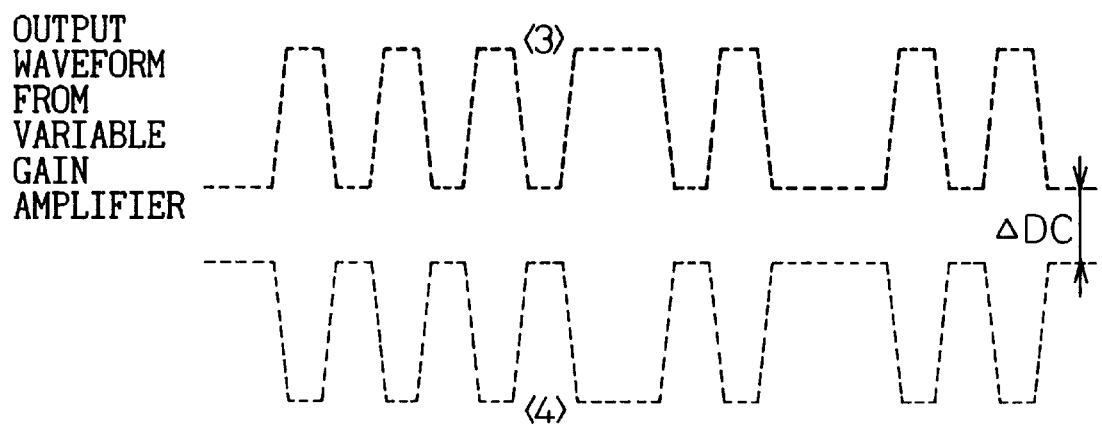
FIG. 10 is a waveform diagram for explaining a DC level deviation of differential outputs from the variable gain amplifier circuit.

FIG. 10 is a waveform diagram for explaining the DC discrepancy of the differential outputs from the variable gain amplifier circuit. In a similar waveform diagram shown in FIG. 22, the level of the logic "0" output from one of the differential outputs of the gain amplifier circuit (14 and 44) and the level of the logic "0" output from the other coincide with each other. However, due to the offset or error, a DC discrepancy is sometimes produced between the above two logic "0" levels. This is indicated by ΔDC in the figure.

The third embodiment has the following configuration in order to minimize this DC discrepancy ADC to zero.

Provision is made of a dummy side DC feedback unit 61 connected to one of the differential inputs of the dummy side variable gain amplifier circuit 14. This is used for making the output level corresponding to the logic "0" from one of the differential outputs of this dummy side variable gain amplifier circuit 14 and the output level corresponding to the logic "0" from the other of the differential outputs of this dummy side variable gain amplifier circuit 14 coincide.

Further, provision is made of a DC feedback unit 63 connected to one of the differential inputs of the variable gain amplifier circuit 44. This is used for making the output level corresponding to the logic "0" from one of the differential outputs of this variable gain amplifier circuit 44 and the output level corresponding to the logic "0" from the other of the differential outputs of this variable gain amplifier circuit 44 coincide.

Both of the dummy side DC feedback unit 61 and the DC feedback unit 63 have the same configuration. In the figure, as one example, a configuration comprising bottom detection circuits (64, 67), peak detection circuits (65, 68), and DC control amplifier circuits (66, 69) for performing DC feedback so as to make the difference between outputs from these circuits zero is shown.

Note that, in FIG. 8, the bottom detection circuit 53 for the ATC circuit shown in FIG. 6 is commonly used for the bottom detection circuit 67 so as to simplify the circuit. Needless to say another bottom detection circuit can be used when the design of the time constant etc. is different.

Looking at the pre-amplifier circuit 12 in the third embodiment, an example where a wide dynamic range (DR) pre-amplifier circuit is also adopted is shown. The wide DR pre-amplifier circuit 55 avoids a saturation of the circuit 55 by turning on the transistor 56 connected to the input of the circuit 55 and by-passing the current when an excess input current is generated from the photodiode 11. Therefore, it can operate in a wide input dynamic range.

Next, the problem of low frequency level variation will be studied.

Figure 11:
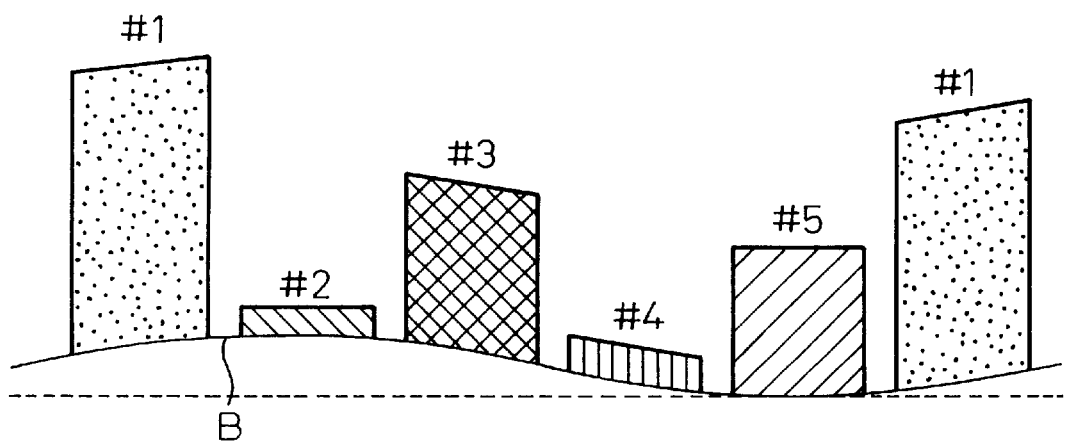
FIG. 11 is a waveform diagram for explaining a low frequency level variation.

FIG. 11 is a waveform diagram for explaining the low frequency level variation. The explanation heretofore was predicated on the base level of the burst optical signal, that is, the base level of the input signal $S_{in}$, being constant. However, the base level is not constant but is sometimes accompanied by a low frequency level variation as shown in B of FIG. 11. This is because, for example, a low frequency monitor signal is sometimes sent from the office side equipment 1 so as to monitor the state etc. of each subscriber or measure a distance up to each subscriber. This is mixed with the burst optical signal and causes a variation of the level of the base level portion.

Figure 12:
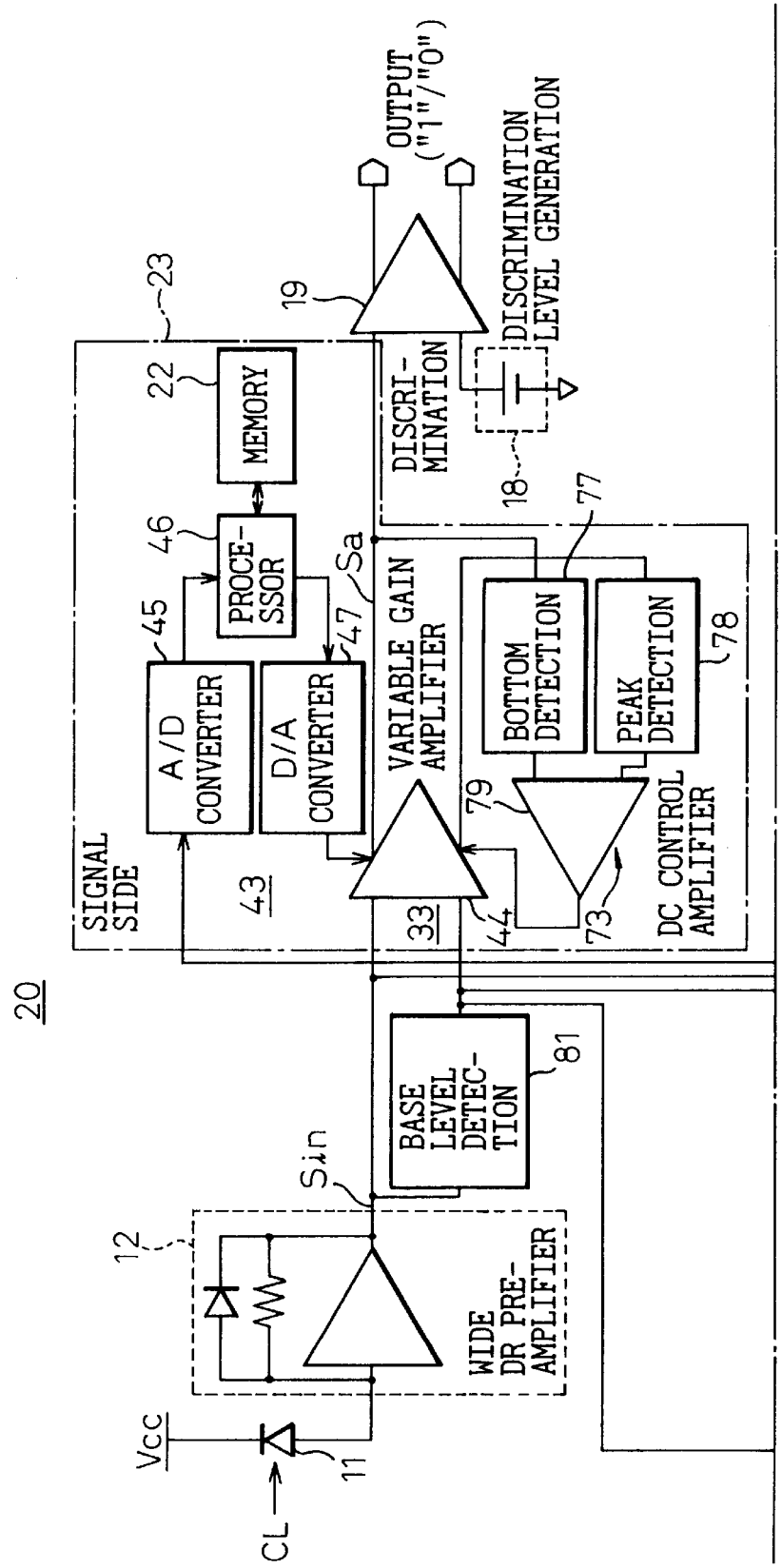
FIG. 12 is a first part of a view of a fourth embodiment according to the present invention.
Figure 13:
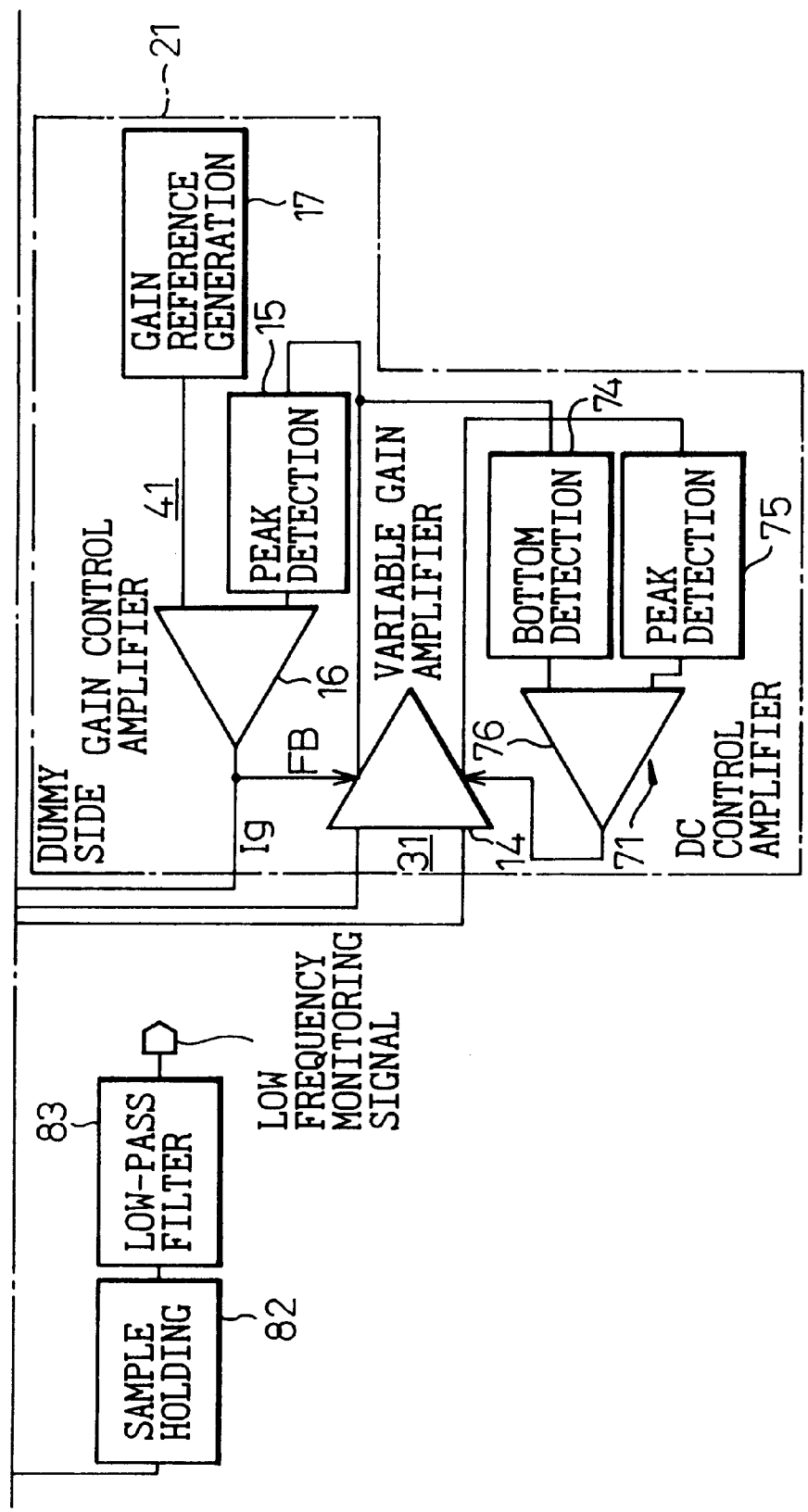
FIG. 13 is a second part of the view of the fourth embodiment according to the present invention.

In order to deal with such a low frequency level variation, in the fourth embodiment, the configuration shown in FIGS. 12 and 13 is adopted.

FIG. 12 and FIG. 13 are first and second parts of a view of the fourth embodiment according to the present invention.

This fourth embodiment is characterized in that a base level detection circuit is introduced in place of the DC level generating circuit 13 of the first embodiment. This detects an output level corresponding to the logic "0" from the pre-amplifier circuit 12 and gives this to one of the differential inputs of the dummy side variable gain amplifier circuit 14. Then, it gives an output level corresponding to the logic "0" to one of the differential inputs of the variable gain amplifier circuit 44.

For this reason, it brings such an advantage that the base level detection circuit can effectively detect also the low frequency level variation. This will be explained in further detail.

The dummy side variable gain amplifier circuit 14 comprises a differential amplifier circuit receiving the input signal $S_{in}$ at one of differential inputs. The input stage of this dummy side variable gain amplifier circuit 14 is provided with a base level detection circuit 81 which can detect the low frequency level variation contained in the base level of the input signal $S_{in}$ and apply this to the other of the differential inputs of the differential amplifier circuit.

Further, the variable gain amplifier circuit 44 comprises a differential amplifier circuit receiving the input signal $S_{in}$ at one of its differential inputs. The input stage of this variable gain amplifier circuit 44 is provided with a base level detection circuit 81 which can detect the low frequency level variation contained in the base level of the input signal $S_{in}$ and apply this to the other of the differential inputs of the differential amplifier circuit.

Preferably, above one circuit is commonly used for the two base level detection circuits as illustrated. Note that the input signal $S_{in}$ is the output of the pre-amplifier circuit 12, so has a waveform obtained by vertically reversing the waveform shown in FIG. 11. Accordingly, the base level detection circuit 81 is realized as for example a peak detection circuit detecting the peak of the input signal $S_{in}$. Note that, as mentioned above, the base level detection circuit gives an "0" level of the input signal $S_{in}$ in place of the DC level generating circuit of the first embodiment, therefore effectively operates even in a case of no low frequency monitor signal.

Thus, a low frequency level variation (B of FIG. 11) is extracted from the base level detection circuit 81. If the variation level is used as each reference voltage of the variable gain amplifier circuits 14 and 44, the low frequency level variation component can be eliminated from the input signal $S_{in}$.

When the low frequency level variation is due to the low frequency monitor signal and it is necessary to extract this, the low frequency monitor signal is output through a sample holding circuit 82 and low-pass filter circuit 83 shown in FIG. 13. Note that, there is a possibility of disturbance of the signal waveform in the header of each cell signal (packet), therefore the signal is preferably input to the sample holding circuit (82) and low-pass filter circuit 83 at the latter half of each packet at which the signal waveform is stabilized as much as possible. When the disturbance of the waveform in the header is small, the sample holding circuit may be eliminated.

Further, the present embodiment shows an example of a configuration provided with a dummy side offset cancel feedback unit 71 and an offset cancel feedback unit 73. Note that these offset cancel feedback units may be used in the other embodiments as well except the third embodiment.

The dummy side offset cancel feedback unit 71 is connected to the offset cancel control input of the dummy side variable gain amplifier circuit 14 and used for making the output level corresponding to the logic "0" from one of the differential outputs of this dummy side variable gain amplifier circuit 14 and the output level corresponding to the logic "0" from the other of the differential outputs of this dummy side variable gain amplifier circuit 14 coincide.

Further, the offset cancel feedback unit 73 is connected to the gain control input of the variable gain amplifier circuit 14 and used for making the output level corresponding to the logic "0" from one of the differential outputs of this variable gain amplifier circuit 44 and the output level corresponding to the logic "0" from the other of the differential outputs of this variable gain amplifier circuit 44 coincide.

Note that the offset cancel control input will be shown in detail in the later FIG. 18.

In some cases, a DC discrepancy ΔDC similar to that shown in FIG. 10 is produced due to the output error of the base level detection circuit 81 and the offset peculiar to the variable gain amplifier circuits (14, 44). The offset cancel feedback units (71, 73) are introduced so as to reduce this to zero.

Both of the dummy side offset cancel feedback unit 71 and the offset cancel feedback unit 73 have the same configuration. In the figure, as one example, a configuration is shown comprising bottom detection circuits (74, 77), peak detection circuits (75, 78), and DC control amplifier circuits (76, 79) performing DC feedback so as to reduce the difference between outputs from these circuits to zero.

Figure 14:
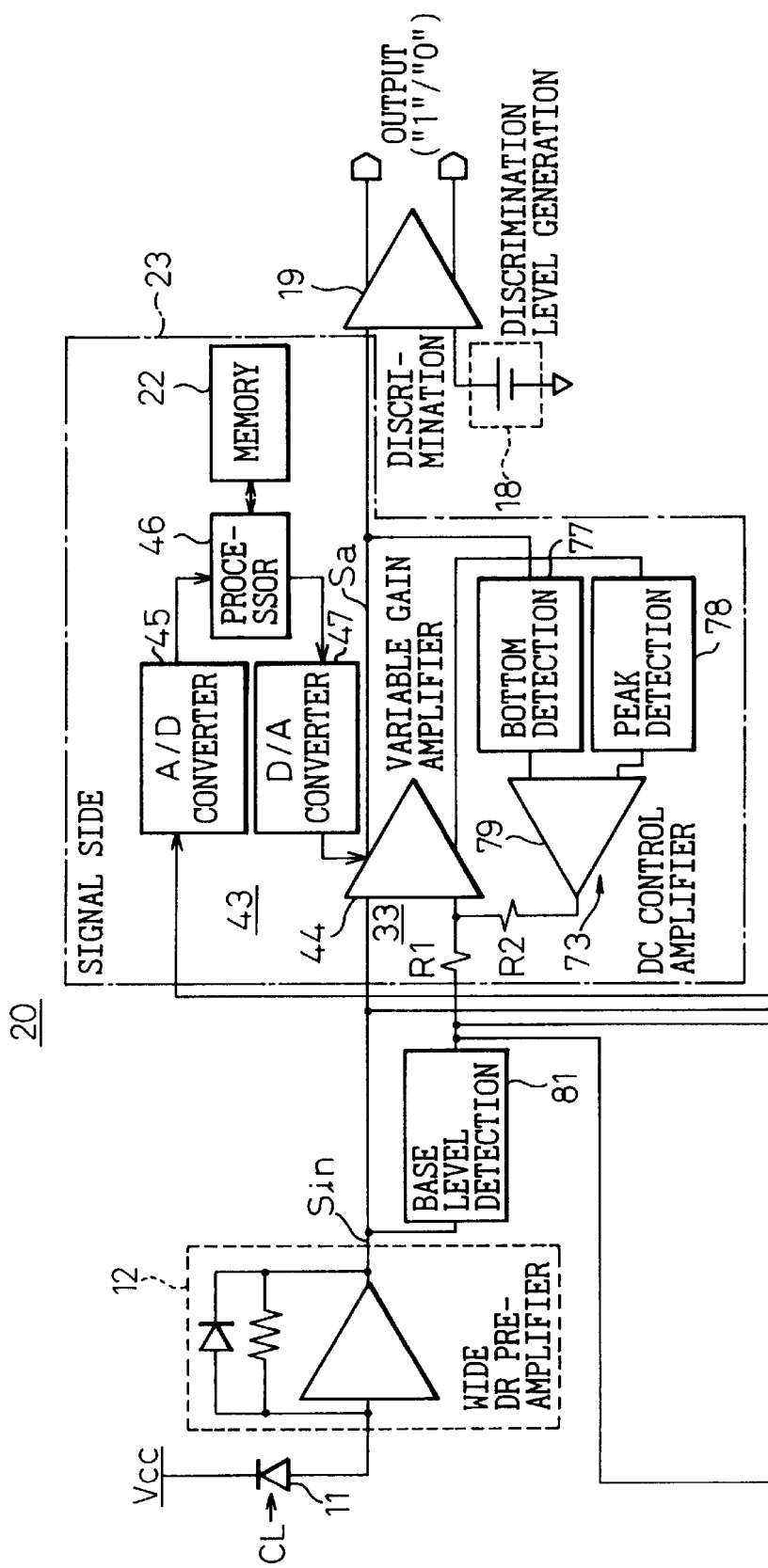
FIG. 14 is a first part of a view of a modified fourth embodiment according to the present invention.
Figure 15:
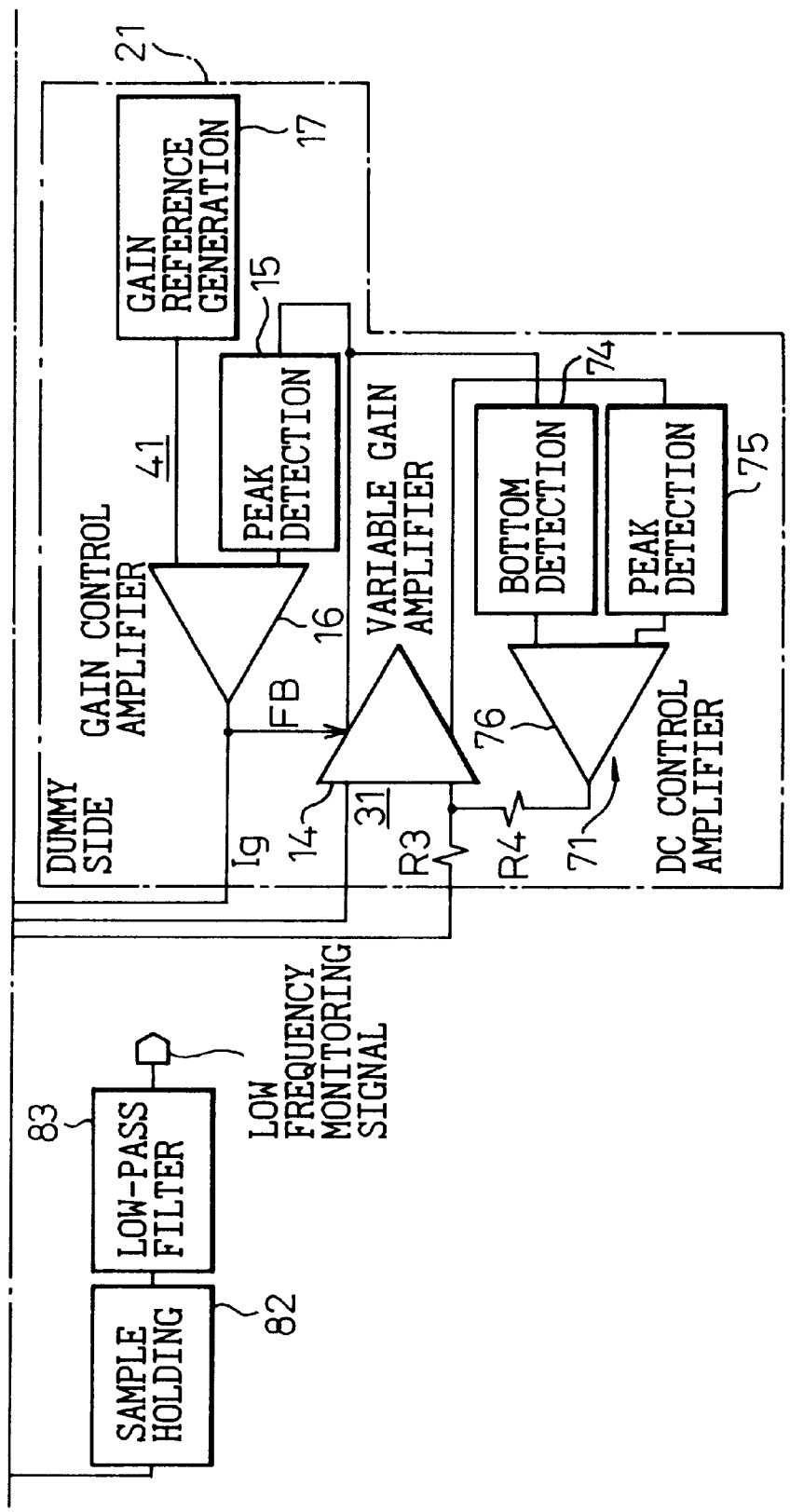
FIG. 15 is a second part of the view of the modified fourth embodiment according to the present invention.

FIG. 14 and FIG. 15 are first and second parts of a view of a modified fourth embodiment according to the present invention.

In this modified fourth embodiment, the output of the DC control amplifier circuit 79 shown in FIG. 12 is fed back to one of the differential inputs of the differential amplifier circuit forming the variable gain amplifier circuit 44 by introducing a first resistor R1 and a second resistor R2 as shown in FIG. 14. Similarly. the output of the DC control amplifier circuit 76 shown in FIG. 13 is fed back to one differential input of the differential amplifier circuit forming the variable gain amplifier circuit 14 by introducing a third resistor R3 and a fourth resistor R4 as shown in FIG. 15.

Figure 16:
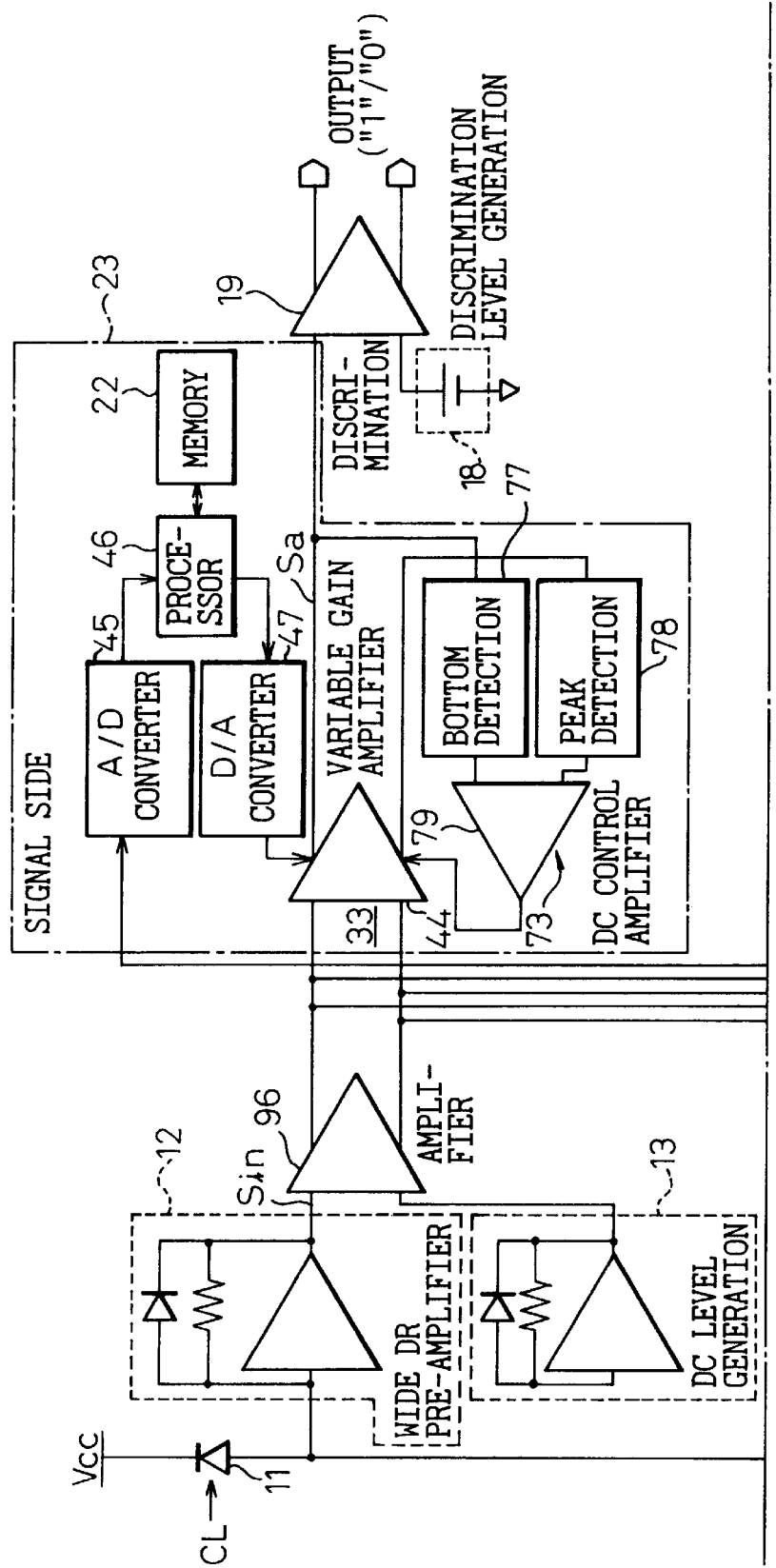
FIG. 16 is a first part of a view of a fifth embodiment according to the present invention.
Figure 17:
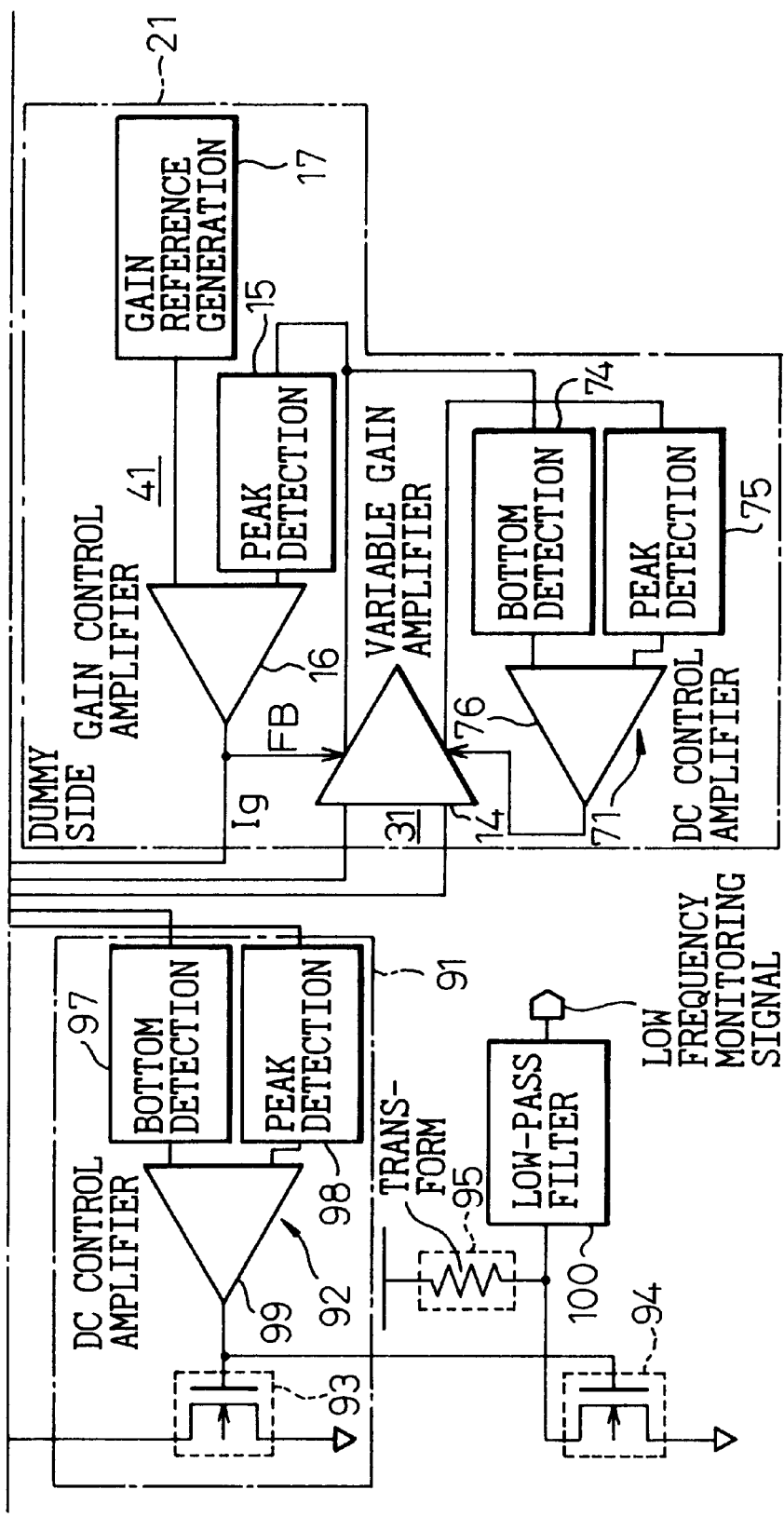
FIG. 17 is a second part of the view of the fifth embodiment according to the present invention.

FIG. 16 and FIG. 17 are first and second parts of a view of a fifth embodiment according to the present invention.

The characteristic feature of the fifth embodiment resides in the provision of a low frequency level variation eliminating means 91 for absorbing the low frequency level variation contained in the base level of the input signal $S_{in}$ before the input signal $S_{in}$ is input to the dummy side variable gain amplifying unit 31 and the signal side variable gain amplifying unit 33.

This low frequency level variation eliminating means 91 receives the input signal $S_{in}$ from the pre-amplifier circuit 12 directly or via the differential amplifier circuit 96 performing linear amplification as illustrated and negatively feeds back the low frequency level variation (B) to the input of the pre-amplifier circuit 12.

This low frequency level variation eliminating means 91 comprises a low frequency level variation detection unit 92 provided on the output side of the pre-amplifier circuit 12 and a first voltage controlled current source 93 directly connected to the photodiode 11 according to the illustrated example, and a control voltage is applied, in accordance with the low frequency level variation detected by the low frequency level variation detection unit 92, to the first voltage controlled current source 93 to draw a current in accordance with the low frequency level variation from the input side of the pre-amplifier circuit 12.

The low frequency level variation detection unit 92 is constituted by, as one example, a bottom detection circuit 97, a peak detection circuit 98, and a DC control amplifier circuit 99 for applying feedback so as to reduce the difference between the outputs from these circuits to zero.

Further, provision is made of a second voltage controlled current source 94 controlled by the control voltage in accordance with the low frequency level variation detected by the low frequency level variation detection unit 92 and a current/voltage transforming circuit 95 for generating a voltage proportional to the drawn current by this second voltage controlled current source 94. The low frequency level variation is extracted via a low-pass filter circuit 100 by this current/voltage transforming circuit 95. This low frequency level variation is just the low frequency monitor signal mentioned above.

Figure 18:
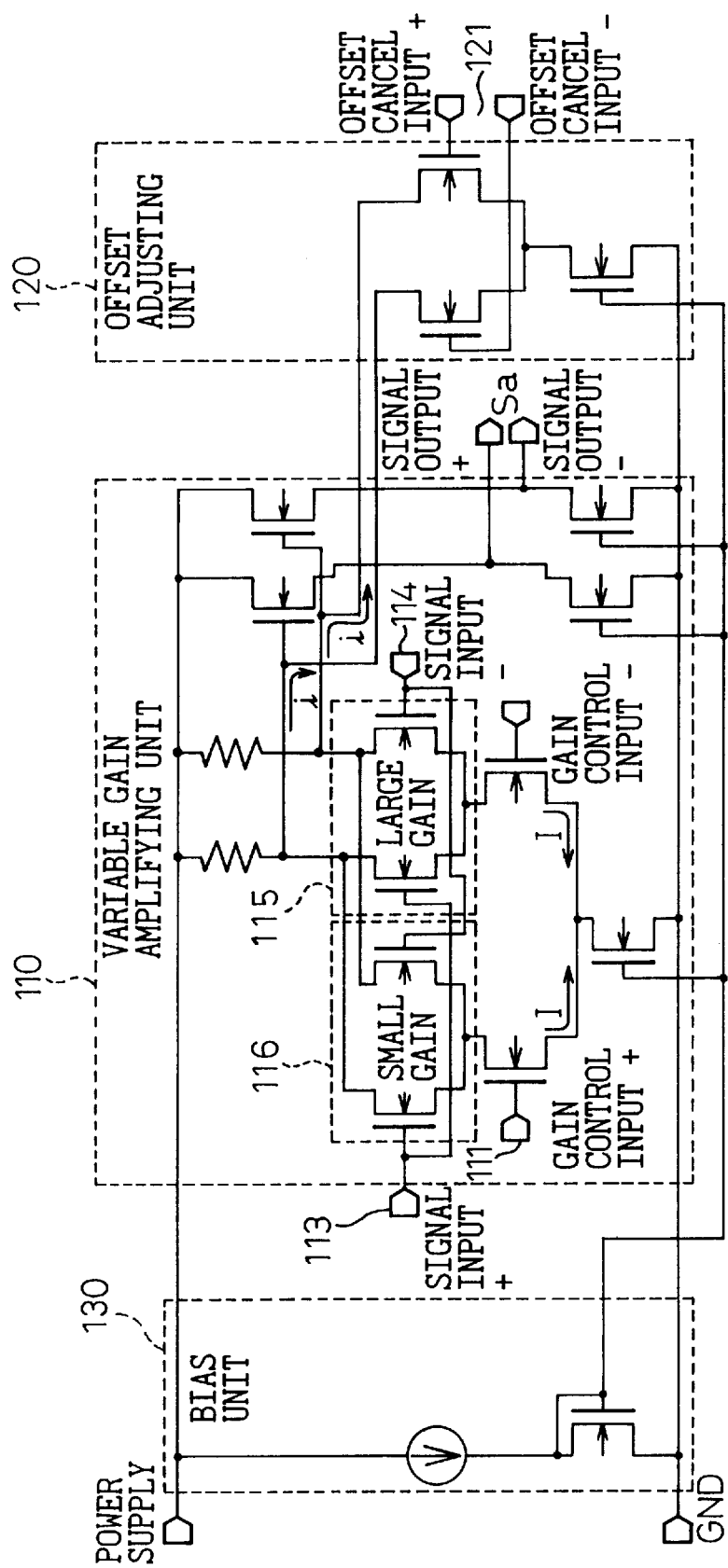
FIG. 18 is a view of an example of the variable gain amplifier circuit.

FIG. 18 is a view of an example of the variable gain amplifier circuit. The above variable gain amplifier circuits (14, 44) can be constituted as shown in the figure. It comprises a variable gain amplifying unit 110 as a main part and an offset adjustment unit 120 and bias unit 130 attached to this. Note that the offset adjustment unit 120 is unnecessary for the first, second, third and the modified fourth embodiments shown in FIG. 14 and FIG. 15.

Referring to the variable gain amplifier circuit 14 shown in FIG. 12 as a representative case, the offset cancel control input receiving the output from the DC control amplifier circuit 79 is indicated as the offset cancel control input (+, −) 121 in FIG. 18.

The inherent gain control input from the gain control amplifier circuit 16 is indicated as the gain control inputs 111 and 112 of FIG. 18.

The differential inputs of the variable gain amplifier circuit 14 are indicated as signal inputs 113 and 114.

The main part of the variable gain amplifying unit 110 comprises a large gain differential transistor pair 115 and a small gain differential transistor pair 116.

The final amplified signal is taken out as Sa shown at the center of FIG. 18.

In the end, by controlling the amount of current (i in the figure) to be drawn from each source side of the differential transistor pairs 115 and 116 and controlling the amount of current (I in the figure) to be drawn from each drain side thereof, the gain can be set to an intended value.

As explained above, according to the present invention, when cell signals CL transmitted from the subscribers in bursts in units of packets are received at the office side equipment, the logic can be substantially instantaneously and stably discriminated from the header for any cell signal CL. Therefore, the training bit train added to the header of each packet in the related art becomes unnecessary, so the transmission efficiency of the entire transmission system is rapidly improved.

What is claimed is:

1. An optical signal receiving apparatus comprising:
   a pre-amplifier circuit for amplifying an output from a photodiode receiving cell signals transmitted from subscribers;
   a dummy side variable gain amplifying unit receiving as its input signal the output from said pre-amplifier circuit, performing the gain control by feedback control, and outputting the gain control signal when a dummy amplified signal having a predetermined output amplitude is produced as the gain information;
   a memory unit for holding said gain information; and
   a signal side variable gain amplifying unit receiving as its input signal the output from said pre-amplifier circuit, performing the gain control by feedfoward control by using the gain set by said gain information from said memory unit, and outputting the amplified signal having the predetermined output amplitude.

2. An optical signal receiving apparatus according to claim 1, further having a discrimination circuit for receiving as its input said amplified signal output from said signal side variable gain amplifying unit, discriminating the logics "1" and "0" of the amplified signal, and generating a digital output.

3. An optical signal receiving apparatus according to claim 2, wherein:
   said discrimination circuit is provided with an automatic discrimination level control means for giving a discrimination level for discriminating the logics "1" and "0" of said amplified signal; and
   said automatic discrimination level control means comprises
   a peak detection circuit and bottom detection circuit for respectively detecting the maximum level and minimum level of said amplified signal output from said signal side variable gain amplifying unit and
   a voltage dividing circuit for generating a predetermined divided voltage of each output voltage from said peak detection circuit and bottom detection circuit and producing said discrimination level.

4. An optical signal receiving apparatus according to claim 1, wherein said dummy side variable gain amplifying unit comprises a dummy side variable gain amplifier circuit for receiving said input signal and amplifying the same and a dummy side gain control amplifier circuit for forming a feedback loop with respect to said dummy side variable gain amplifier circuit and also outputs the gain given from the dummy side gain control amplifier circuit to the dummy side variable gain amplifier circuit to said memory unit as said gain information.

5. An optical signal receiving apparatus according to claim 3, wherein provision is made of a DC level generating circuit for applying a substantially equal DC level to an output level corresponding to the logic "0" from said pre-amplifier circuit at one of the differential inputs of said dummy side variable gain amplifier circuit.

6. An optical signal receiving apparatus according to claim 4, wherein provision is made of a base level detection circuit for detecting an output level corresponding to the logic "0" from said pre-amplifier circuit at one of the differential inputs of said dummy side variable gain amplifier circuit.

7. An optical signal receiving apparatus according to claim 6, wherein said base level detection circuit acts as a circuit for detecting the low frequency level variation contained in the base level of said input signal.

8. An optical signal receiving apparatus according to claim 4, wherein provision is made of a dummy side DC feedback unit connected to one of the differential inputs of said dummy side variable gain amplifier circuit and used for making the output level corresponding to the logic "0" from one of the differential outputs of the dummy side variable gain amplifier circuit and the output level corresponding to the logic "0" from the other of the differential outputs of the dummy side variable gain amplifier circuit coincide.

9. An optical signal receiving apparatus according to claim 4, wherein provision is made of a dummy side offset cancel feedback unit for making the output level corresponding to the logic "0" from one of the differential outputs of said dummy side variable gain amplifier circuit and the output level corresponding to the logic "0" from the other of the differential outputs of the dummy side variable gain amplifier circuit coincide.

10. An optical signal receiving apparatus according to claim 1, wherein said signal side variable gain amplifying unit comprises:

a variable gain amplifier circuit for receiving said input signal and amplifying the same; and a gain setting unit for setting the gain, under a feedfoward control, by reading said gain information held in said memory unit for said variable gain amplifier circuit.

11. An optical signal receiving apparatus according to claim 10, wherein provision is made of a DC level generating circuit for applying a substantially equal DC level to an output level corresponding to the logic "0" from said pre-amplifier circuit at one of the differential inputs of said variable gain amplifier circuit.

12. An optical signal receiving apparatus according to claim 10, wherein provision is made of a base level detection circuit for detecting an output level corresponding to the logic "0" from said pre-amplifier circuit at one of the differential inputs of said variable gain amplifier circuit.

13. An optical signal receiving apparatus according to claim 8, wherein said base level detection circuit acts as a circuit for detecting the low frequency level variation contained in the base level of said input signal.

14. An optical signal receiving apparatus according to claim 10, wherein provision is made of a DC feedback unit connected to one of the differential inputs of said variable gain amplifier circuit and used for making the output level corresponding to the logic "0" from one of the differential outputs of the variable gain amplifier circuit and the output level corresponding to the logic "0" from the other of the differential outputs of the variable gain amplifier circuit coincide.

15. An optical signal receiving apparatus according to claim 10, wherein provision is made of an offset cancel feedback unit for making the output level corresponding to the logic "0" from one of the differential outputs of said variable gain amplifier circuit and the output level corresponding to the logic "0" from the other of the differential outputs of the variable gain amplifier circuit coincide.

16. An optical signal receiving apparatus according to claim 1, wherein said signal side variable gain amplifying unit includes said memory unit and has an A/D converter for converting said analog gain information to digital gain information, a processor for writing the digital gain information from the A/D converter into said memory unit, and a D/A converter for converting the gain information read from the memory unit via the processor to said analog gain information.

17. An optical signal receiving apparatus according to claim 16, wherein said processor accesses said memory unit whenever said cell signal is received and reads said gain information held immediately before for each subscriber, when receiving said cell signal from each subscriber according to sequence information held in it or sequence information given externally, and thereby sets the gain of said signal side variable gain amplifying unit.

18. An optical signal receiving apparatus according to claim 1, wherein provision is made of a low frequency level variation eliminating means for absorbing the low frequency level variation contained in the base level of said input signal before the input signal is input to said dummy side variable gain amplifying unit and said signal side variable gain amplifying unit.

19. An optical signal receiving apparatus according to claim 18, wherein said low frequency level variation eliminating means comprises a low frequency level variation detection unit provided on an output side of said pre-amplifier circuit and a first voltage controlled current source serially connected to said photodiode, where the control voltage is applied, in accordance with the low frequency level variation detected by said low frequency level variation detection unit, to said first voltage controlled current source and the current is drawn, in accordance with the low frequency level variation, from the input side of said pre-amplifier circuit.

20. An optical signal receiving apparatus according to claim 19, wherein provision is further made of a second voltage controlled current source controlled by a control voltage in accordance with the low frequency level variation detected by said low frequency level variation detection unit and a current/voltage transforming circuit for producing a voltage proportional to the drawn current by said second voltage controlled current source and said low frequency level variation is extracted by the current/voltage transforming circuit.

21. A method for receiving an optical signal comprising:

a first step of receiving optical cell signals at a photodiode and transforming the same to electrical input signals;

a second step of amplifying said input signal with a variable gain by feedback control and generating a dummy amplified signal having predetermined output amplitude and storing the gain information indicating the gain; and a third step for amplifying a subsequently received input signal with said gain indicated in said gain information by feedfoward control and generating an amplified signal having a predetermined output amplitude.

* * * * *

UNITED STATES PATENT AND TRADEMARK OFFICE
CERTIFICATE OF CORRECTION

PATENT NO. : 6,169,619 B1
DATED : January 2, 2001
INVENTOR(S) : Satoshi Ide

It is certified that error appears in the above-identified patent and that said Letters Patent is hereby corrected as shown below:

Please delete all of the claims (Col. 14, line 25 through col. 18, line 7), and replace with the following claims:

1. An optical signal receiving apparatus comprising:
a pre-amplifier circuit amplifying an output from a photodiode receiving cell signals transmitted from subscribers and producing an amplified output;
a dummy side variable gain amplifying unit receiving as an input signal the amplified output from said pre-amplifier circuit, performing gain control by feedback control and outputting a gain control signal, as gain information, when a dummy amplified signal having a predetermined output amplitude is produced;
a memory unit holding said gain information; and
a signal side variable gain amplifying unit receiving as input signal the amplified output from said pre-amplifier circuit, performing gain control by feedfoward control using the gain information from said memory unit, and outputting an amplified signal having a predetermined output amplitude.

2. An optical signal receiving apparatus according to claim 1, further comprising.
a discrimination circuit receiving as its input said amplified signal output from said signal side variable gain amplifying unit, discriminating the logics "1" and "0" of the amplified signal, and generating a digital output.

3. An optical signal receiving apparatus according to claim 1, wherein said dummy side variable gain amplifying unit further comprises:
a dummy side variable gain amplifier circuit receiving said input signal and amplifying said input signal; and
a dummy side gain control amplifier circuit forming a feedback loop with respect to said dummy side variable gain amplifier circuit and outputting the gain control signal, given from the dummy side gain control amplifier circuit to the dummy side variable gain amplifier circuit, to said memory unit as said gain information.

4. An optical signal receiving apparatus according to claim 1, wherein said signal side variable gain amplifying unit further comprises:
a variable gain amplifier circuit receiving said input signal and amplifying the same; and
a gain setting unit setting the gain, under a feedfoward control, by reading said gain information held in said memory unit for said variable gain amplifier circuit.

UNITED STATES PATENT AND TRADEMARK OFFICE
CERTIFICATE OF CORRECTION

PATENT NO. : 6,169,619 B1
DATED : January 2, 2001
INVENTOR(S) : Satoshi Ide

It is certified that error appears in the above-identified patent and that said Letters Patent is hereby corrected as shown below:

5. An optical signal receiving apparatus according to claim 2, wherein:
said discrimination circuit is provided with an automatic discrimination level control unit producing a discrimination level for discriminating the logics "1" and "0" of said amplified signal; and
said automatic discrimination level control unit further comprises:
a peak detection circuit and a bottom detection circuit respectively detecting the maximum level and minimum level of said amplified signal output from said signal side variable gain amplifying unit, and
a voltage dividing circuit generating a predetermined divided voltage of each output voltage from said peak detection circuit and bottom detection circuit and producing said discrimination level.

6. An optical signal receiving apparatus according to claim 3, further comprising:
a DC level generating circuit applying a substantially equal DC level to an output level corresponding to the logic "0" from said pre-amplifier circuit at one of the differential inputs of said dummy side variable gain amplifier circuit.

7. An optical signal receiving apparatus according to claim 4, further comprising:
a DC level generating circuit applying a substantially equal DC level to an output level corresponding to the logic "0" from said pre-amplifier circuit at one of the differential inputs of said variable gain amplifier circuit.

8. An optical signal receiving apparatus according to claim 3, further comprising:
a base level detection circuit detecting an output level corresponding to logic "0" from said pre-amplifier circuit at one of the differential inputs of said dummy side variable gain amplifier circuit.

9. An optical signal receiving apparatus according to claim 4, further comprising:
a base level detection circuit detecting an output level corresponding to the logic "0" from said pre-amplifier circuit at one of the differential inputs of said variable gain amplifier circuit.

10. An optical signal receiving apparatus according to claim 3, further comprising:
a dummy side DC feedback unit connected to one of the differential inputs of said dummy side variable gain amplifier circuit and used for making the output level corresponding to the logic "0" from one of the differential outputs of the dummy side variable gain amplifier circuit and the output level corresponding to the logic "0" from the other of the differential outputs of the dummy side variable gain amplifier circuit coincide.

UNITED STATES PATENT AND TRADEMARK OFFICE
CERTIFICATE OF CORRECTION

PATENT NO. : 6,169,619 B1
DATED : January 2, 2001
INVENTOR(S) : Satoshi Ide

It is certified that error appears in the above-identified patent and that said Letters Patent is hereby corrected as shown below:

11. An optical signal receiving apparatus according to claim 4, further comprising:
a DC feedback unit connected to one of the differential inputs of said variable gain amplifier circuit and used for making the output level corresponding to the logic "0" from one of the differential outputs of the variable gain amplifier circuit and the output level corresponding to the logic "0" from the other of the differential outputs of the variable gain amplifier circuit coincide.

12. An optical signal receiving apparatus according to claim 3, further comprising:
a dummy side offset cancel feedback unit further comprising:
an offset cancel feedback unit making the output level corresponding to the logic "0" from one of the differential outputs of said variable gain amplifier circuit and the output level corresponding to the logic "0" from the other of the differential outputs of the variable gain amplifier circuit coincide.

14. An optical signal receiving apparatus according to claim 1, wherein said signal side variable gain amplifying unit further comprising:
and A/D converter converting said analog gain information to digital gain information, a processor writing the digital gain information from the A/D converter into said memory unit, and a D/A converter converting the gain information read from the memory unit via the processor to analog gain information.

15. An optical signal receiving apparatus acccording to claim 14, wherein said processor accesses said memory unit whenever said cell signal is received and reads therefrom said digital gain information, held immediately before for each subscriber, when receiving said cell signal from each subscriber according to sequence information held in said memory unit or sequence information provided externally, and thereby sets the gain of said signal side variable gain amplifying unit.

16. An optical signal receiving apparatus according to claim 8, wherein said base level detection circuit detects a low frequency level variation contained in a base level of said input signal detected by
the base level input signal.

17. An optical signal receiving apparatus according to claim 9, wherein said base level detection circuit detects a low frequency level variation contained in a base level of said input signal by the base level input signal.

UNITED STATES PATENT AND TRADEMARK OFFICE
CERTIFICATE OF CORRECTION

PATENT NO.   : 6,169,619 B1
DATED        : January 2, 2001
INVENTOR(S)  : Satoshi Ide It is certified that error appears in the above-identified patent and that said Letters Patent is hereby corrected as shown below:

18.    An optical signal receiving apparatus according to claim 1, further comprising:
a low frequency level variation eliminating unit absorbing a low frequency level variation contained in a base level of the input signal before the input signal is input to said dummy side variable gain amplifying unit and said signal side variable gain amplifying unit.

19.    An optical signal receiving apparatus according to claim 18, wherein said low frequency level variation eliminating unit further comprises:
a low frequency level variation detection unit connected to an output side of said pre-amplifier circuit; and
a first voltage controlled current source serially connected to said photodiode, to which first voltage controlled current source the control voltage is applied, in accordance with the low frequency level variation detected by said low frequency level variation detection unit, and the current is drawn, in accordance with the low frequency level variation, from an input side of said pre-amplifier circuit.

20.    An optical signal receiving apparatus according to claim 19, further comprising:
a second voltage controlled current source controlled by the said control voltage in accordance with the low frequency level variation detected by said low frequency level variation detection unit;
a current/voltage transforming circuit producing a voltage proportional to the drawn current by said second voltage controlled current source; and
said low frequency level variation is extracted by the current/voltage transforming circuit.

UNITED STATES PATENT AND TRADEMARK OFFICE
CERTIFICATE OF CORRECTION

PATENT NO. : 6,169,619 B1
DATED : January 2, 2001
INVENTOR(S) : Satoshi Ide

It is certified that error appears in the above-identified patent and that said Letters Patent is hereby corrected as shown below:

21. A method for receiving an optical signal, comprising:
receiving optical cell signals at a photodiode and transforming the received optical signals to electrical input signals;
amplifying said electrical input signals with a variable gain by feedback control and generating a dummy amplified signal having a predetermined output amplitude and storing gain information indicating a current level of the variable gain; and
amplifying a subsequently received input signal with said gain information by feedfoward control and generating an amplified output signal corresponding to the subsequently received signal and having a predetermined output amplitude.

Signed and Sealed this

Twenty-first Day of May, 2002

*Attest:*

JAMES E. ROGAN
*Attesting Officer*   *Director of the United States Patent and Trademark Office*